(12) United States Patent
Sakuma

(10) Patent No.: US 12,130,304 B2
(45) Date of Patent: Oct. 29, 2024

(54) INERTIAL SENSOR MODULE

(71) Applicant: SEIKO EPSON CORPORATION, Tokyo (JP)

(72) Inventor: Masayasu Sakuma, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/942,461

(22) Filed: Sep. 12, 2022

(65) Prior Publication Data
US 2023/0078589 A1 Mar. 16, 2023

(30) Foreign Application Priority Data
Sep. 14, 2021 (JP) ................. 2021-149174

(51) Int. Cl.
*G01P 15/18* (2013.01)
*G01C 19/5776* (2012.01)
*G01P 1/02* (2006.01)
*G01P 3/44* (2006.01)
*G01P 15/08* (2006.01)

(52) U.S. Cl.
CPC .......... *G01P 15/18* (2013.01); *G01C 19/5776* (2013.01); *G01P 1/023* (2013.01); *G01P 3/44* (2013.01); *G01P 15/0802* (2013.01); *G01P 15/0888* (2013.01)

(58) Field of Classification Search
CPC .. G01P 15/18; G01P 15/0888; G01P 15/0802; G01P 15/08; G01P 15/14; G01P 1/02; G01P 1/023; G01P 1/006; G01P 3/44; G01C 19/56
See application file for complete search history.

(56) References Cited

U.S. PATENT DOCUMENTS

| | | | | |
|---|---|---|---|---|
| 2002/0183958 A1* | 12/2002 | McCall | ............... | G01C 21/183 702/141 |
| 2005/0000286 A1* | 1/2005 | Campbell | ............... | G01P 15/18 701/3 |
| 2005/0101161 A1* | 5/2005 | Weiblen | ............... | G01P 1/023 439/37 |
| 2005/0103105 A1* | 5/2005 | Emmerich | ............... | G01P 1/023 73/493 |
| 2005/0172713 A1* | 8/2005 | Hosokawa | ............... | G01P 1/023 73/493 |
| 2006/0185432 A1* | 8/2006 | Weinberg | ............... | G01P 3/44 73/510 |
| 2006/0196270 A1* | 9/2006 | Ino | ............... | G01P 15/18 73/514.16 |
| 2006/0250257 A1* | 11/2006 | Reynolds | ............... | G01C 21/166 340/601 |
| 2007/0234804 A1* | 10/2007 | Tamura | ............... | G01P 1/023 73/526 |

(Continued)

FOREIGN PATENT DOCUMENTS

JP 2016-031358 A 3/2016

*Primary Examiner* — Helen C Kwok
(74) *Attorney, Agent, or Firm* — Rankin, Hill & Clark LLP

(57) ABSTRACT

An inertial sensor module includes: a first inertial sensor having a first axis as a detection axis; and a second inertial sensor having the first axis, a second axis, and a third axis as detection axes, in which the first inertial sensor and the second inertial sensor are separated from each other, and detection accuracy of the first inertial sensor is higher than detection accuracy of the second inertial sensor.

13 Claims, 9 Drawing Sheets

(56) References Cited

U.S. PATENT DOCUMENTS

| | | | | |
|---|---|---|---|---|
| 2012/0017676 A1* | 1/2012 | Schmid | .................. | G01C 19/56 |
| | | | | 73/504.02 |
| 2012/0312096 A1* | 12/2012 | Jeung | .................. | G01C 19/5783 |
| | | | | 73/514.01 |
| 2013/0074598 A1* | 3/2013 | Park | .................. | G01C 19/5783 |
| | | | | 73/514.16 |
| 2013/0192371 A1* | 8/2013 | Rytkonen | .............. | G01P 15/125 |
| | | | | 73/514.01 |
| 2015/0097253 A1* | 4/2015 | Tsau | ........................ | H01L 29/84 |
| | | | | 438/51 |
| 2015/0268265 A1* | 9/2015 | Yonezawa | ............... | G01P 15/18 |
| | | | | 73/514.01 |
| 2016/0003863 A1* | 1/2016 | Chau | ...................... | G01P 15/00 |
| | | | | 73/152.46 |
| 2017/0082654 A1* | 3/2017 | Chau | .................. | G01P 15/0888 |
| 2017/0089941 A1* | 3/2017 | Imanaka | ............... | G01P 15/125 |
| 2019/0049484 A1* | 2/2019 | Yanagisawa | ........ | G01P 15/0802 |
| 2019/0101562 A1* | 4/2019 | Kigure | .................. | G01P 15/125 |
| 2019/0204125 A1* | 7/2019 | Yamada | ................. | G01D 3/036 |
| 2019/0285663 A1* | 9/2019 | Chino | .................. | G01P 15/0888 |
| 2019/0320526 A1* | 10/2019 | Sato | ........................ | H05K 1/181 |
| 2020/0033825 A1* | 1/2020 | Otani | .................... | G05D 1/0088 |
| 2020/0378794 A1* | 12/2020 | Yoda | .................... | G01C 25/005 |
| 2021/0072278 A1* | 3/2021 | Horton | ................... | G01C 21/18 |
| 2021/0270686 A1* | 9/2021 | Rogers | ................. | G01L 5/0052 |
| 2022/0155337 A1* | 5/2022 | Kuroda | .................... | G01P 21/00 |
| 2022/0317146 A1* | 10/2022 | Otani | ...................... | G01P 15/18 |
| 2023/0079036 A1* | 3/2023 | Ozawa | .................... | G01P 1/006 |
| | | | | 73/514.01 |
| 2023/0099306 A1* | 3/2023 | Watanabe | ............... | G01P 15/18 |
| | | | | 73/488 |
| 2023/0099359 A1* | 3/2023 | Mitsunaga | .......... | G01P 15/0888 |
| | | | | 73/514.02 |
| 2023/0100231 A1* | 3/2023 | Matsuoka | ............ | G01C 21/183 |
| | | | | 73/514.32 |
| 2023/0125187 A1* | 4/2023 | Nishio | .................. | B81B 7/0041 |
| | | | | 257/787 |
| 2023/0174371 A1* | 6/2023 | Shi | ........................ | G01C 19/00 |
| | | | | 257/415 |
| 2023/0194563 A1* | 6/2023 | Watanabe | ........... | G01P 15/0802 |
| | | | | 73/1.38 |

\* cited by examiner

INERTIAL SENSOR MODULE

The present application is based on, and claims priority from JP Application Serial Number 2021-149174, filed Sep. 14, 2021, the disclosure of which is hereby incorporated by reference herein in its entirety.

BACKGROUND

1. Technical Field

The present disclosure relates to an inertial sensor module.

2. Related Art

JP-A-2016-31358 discloses an inertial sensor module including a three-axis acceleration sensor and a three-axis gyro sensor that are formed of a silicon substrate.

In recent years, a demand for high accuracy of inertial sensor modules has increased. For example, in a system that controls a posture of a vehicle, an inertial sensor module is mounted on the vehicle in order to calculate a roll angle, a pitch angle, and a yaw angle of the vehicle, and it is particularly necessary to accurately calculate the yaw angle. Therefore, an inertial sensor module that can detect a three-axis angular velocity and a one-axis angular velocity with high accuracy is desired. However, an inertial sensor module on which a three-axis silicon MEMS sensor is mounted may not meet the demand for high detection accuracy for a specific one axis.

SUMMARY

An aspect of an inertial sensor module according to the present disclosure includes: a first inertial sensor having a first axis as a detection axis; and a second inertial sensor having the first axis, a second axis, and a third axis as detection axes, in which the first inertial sensor and the second inertial sensor are separated from each other, and detection accuracy of the first inertial sensor is higher than detection accuracy of the second inertial sensor.

Another aspect of an inertial sensor module according to the present disclosure includes: a first inertial sensor having a first axis as a detection axis; a second inertial sensor having the first axis as a detection axis; and an operation circuit, in which detection accuracy of the first inertial sensor is higher than detection accuracy of the second inertial sensor, and the operation circuit determines whether a failure has occurred in the first inertial sensor based on a detection signal of the first axis output from the first inertial sensor and a detection signal of the first axis output from the second inertial sensor.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessary constituent elements of the present disclosure.

1. First Embodiment

Figure 1:
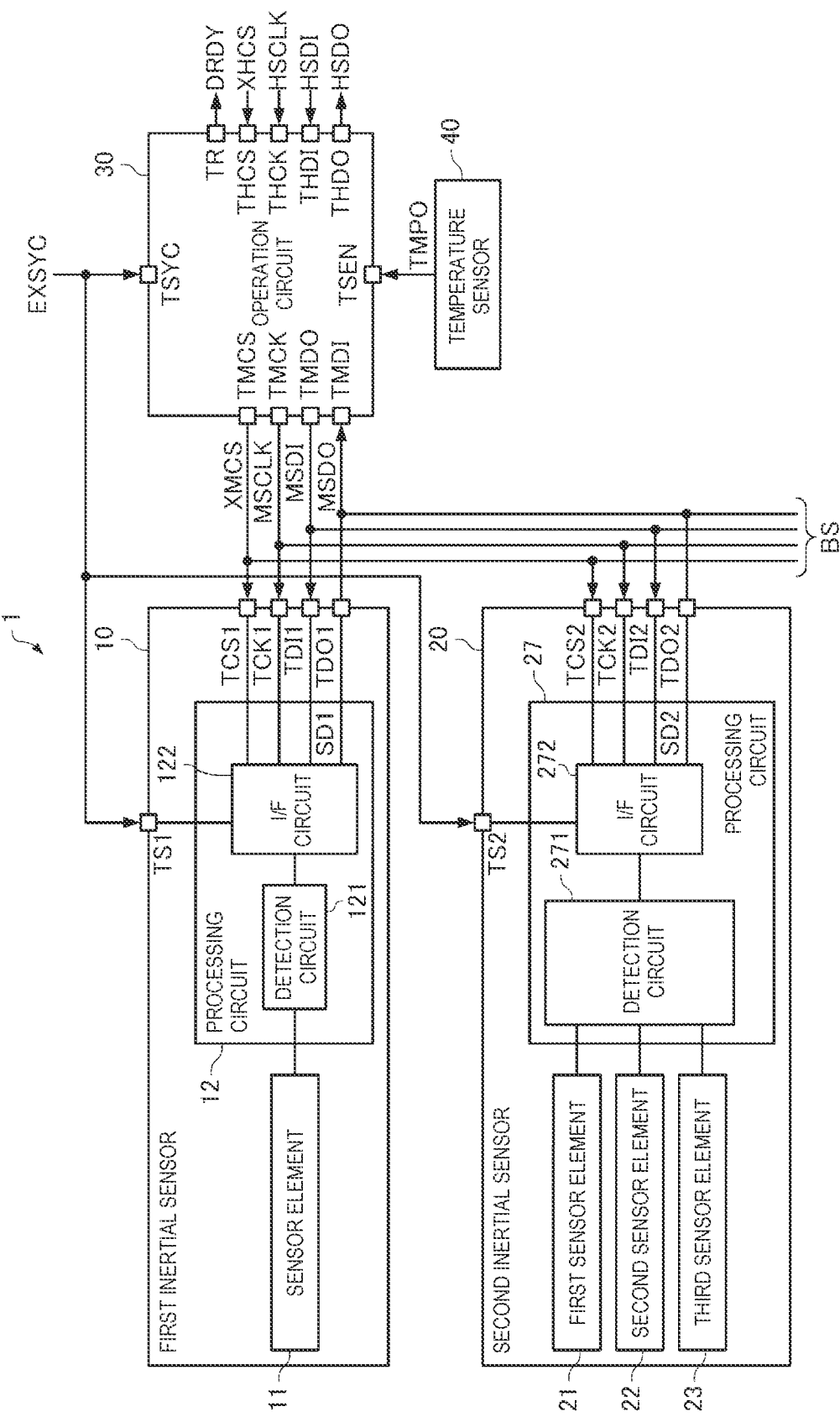
FIG. 1 is a diagram showing an example of a functional configuration of an inertial sensor module according to a first embodiment.

FIG. 1 is a diagram showing an example of a functional configuration of an inertial sensor module 1 according to a first embodiment. As shown in FIG. 1, the inertial sensor module 1 according to the first embodiment includes a first inertial sensor 10, a second inertial sensor 20, an operation circuit 30, and a temperature sensor 40. In the inertial sensor module 1, a part of components in FIG. 1 may be omitted or changed, and other components may be added.

The first inertial sensor 10 is a sensor having a first axis as a detection axis, and includes a sensor element 11 and a processing circuit 12. The first inertial sensor 10 is a device accommodating in a package thereof a printed circuit board on which the sensor element 11 and the processing circuit 12 are mounted. The processing circuit 12 is, for example, an IC chip implemented by a semiconductor. The IC is an abbreviation for integrated circuit. The first inertial sensor 10 includes, for example, a terminal TCS1, a terminal TCK1, a terminal TDI1, a terminal TDO1, and a terminal TS1 which are terminals for external coupling provided in the package.

The second inertial sensor 20 is a sensor having a first axis, a second axis, and a third axis as detection axes, and includes a first sensor element 21, a second sensor element 22, a third sensor element 23, and a processing circuit 27. The second inertial sensor 20 is a device accommodating in a package thereof a silicon substrate on which the first sensor element 21, the second sensor element 22, the third sensor element 23, and the processing circuit 27 are formed. The processing circuit 27 is an IC formed on the silicon substrate. The second inertial sensor 20 includes, for example, a terminal TCS2, a terminal TCK2, a terminal TDI2, a terminal TDO2, and a terminal TS2 which are terminals for external coupling provided in the package.

The sensor element 11 and the first sensor element 21 are both sensor elements that detect the same type of physical quantity with the first axis as a detection axis. The physical quantity is, for example, an angular velocity, an acceleration, an angular acceleration, a velocity, a distance, a pressure, a sound pressure, or a magnetic quantity. For example, when three axes orthogonal to one another are defined as an X-axis, a Y-axis, and a Z-axis, the sensor element 11 and the first sensor element 21 may both detect an angular velocity around the Z-axis, or may both detect an acceleration in an X-axis direction.

The second sensor element 22 is a sensor element that detects a physical quantity with the second axis different from the first axis as a detection axis. The third sensor element 23 is a sensor element that detects a physical quantity with the third axis different from the first axis and the second axis as a detection axis. The physical quantities detected by the first sensor element 21, the second sensor element 22, and the third sensor element 23 may be of the same type or different types from one another. For example, the first sensor element 21 may detect the angular velocity around the Z-axis, the second sensor element 22 may detect an angular velocity around the X-axis, and the third sensor element 23 may detect an angular velocity around the Y-axis. Alternatively, the first sensor element 21 may detect the angular velocity around the Z-axis, the second sensor element 22 may detect an acceleration in the X-axis direction, and the third sensor element 23 may detect an acceleration in a Y-axis direction.

The processing circuit 12 performs physical quantity detection processing on a signal output from the sensor element 11, and outputs first detection data SD1 obtained by the detection processing. The processing circuit 12 includes a detection circuit 121 that performs physical quantity detection processing on the signal output from the sensor element 11, and an interface circuit 122 that outputs the first detection data SD1 obtained by the detection processing of the detection circuit 121. For example, the detection circuit 121 may include an amplifier circuit that amplifies the signal output from the sensor element 11, a wave detection circuit that detects an output signal of the amplifier circuit, a gain adjustment circuit that adjusts a voltage of an output signal of the wave detection circuit, an offset adjustment circuit that adjusts an offset of an output signal of the gain adjustment circuit, and an A/D conversion circuit that converts an output signal of the offset adjustment circuit into a digital signal. The interface circuit 122 receives the digital signal output from the A/D conversion circuit of the detection circuit 121 as the first detection data SD1 at the timing of an external synchronization signal EXSYC received from the terminal TCS1, and outputs the first detection data SD1 in accordance with a read command from the operation circuit 30. The first detection data SD1 includes a detection signal of the first axis obtained by the sensor element 11.

The processing circuit 27 performs physical quantity detection processing on signals output from the first sensor element 21, the second sensor element 22, and the third sensor element 23, and outputs second detection data SD2 obtained by the detection processing. The processing circuit 27 includes a detection circuit 271 that performs physical quantity detection processing on signals output from the first sensor element 21, the second sensor element 22, and the third sensor element 23, and an interface circuit 272 that outputs the second detection data SD2 obtained by the detection processing of the detection circuit 121. For example, the detection circuit 271 may include three amplifier circuits that amplify signals output from the first sensor element 21, the second sensor element 22, and the third sensor element 23, respectively, three wave detection circuits that detect output signals of the respective amplifier circuits, three gain adjustment circuits that adjust voltages of output signals of the respective wave detection circuits, three offset adjustment circuits that adjust offsets of output signals of the respective gain adjustment circuits, and an A/D conversion circuit that converts an output signal of each offset adjustment circuit into a digital signal in a time division manner. The interface circuit 272 receives the digital signal output from the A/D conversion circuit of the detection circuit 271 as the second detection data SD2 at the timing of the external synchronization signal EXSYC received from the terminal TCS2, and outputs the second detection data SD2 in accordance with a read command from the operation circuit 30. The second detection data SD2 includes the detection signal of the first axis obtained by the first sensor element 21, a detection signal of the second axis obtained by the second sensor element 22, and a detection signal of the third axis obtained by the third sensor element 23.

The external synchronization signal EXSYC is a signal supplied from a host device or the like, and is a signal that is active at each synchronization timing. For example, the external synchronization signal EXSYC is a signal that is active at regular intervals. Active means to be at a high level in the case of positive logic and L level in the case of negative logic. The first inertial sensor 10 and the second inertial sensor 20 can generate the first detection data SD1 and the second detection data SD2 at an appropriate timing in which the first detection data SD1 and the second detection data SD2 are synchronized with each other using the external synchronization signal EXSYC, and output the first detection data SD1 and the second detection data SD2 to the operation circuit 30.

The inertial sensor module 1 includes a digital interface bus BS through which the first inertial sensor 10 and the second inertial sensor 20 are electrically coupled to the operation circuit 30.

The digital interface bus BS is a bus conforming to a communication standard of interface processing performed by the interface circuit 122 and the interface circuit 272. In the present embodiment, the digital interface bus BS is a bus conforming to an SPI communication standard, and includes two data signal lines, a clock signal line, and a chip select signal line. The SPI is an abbreviation for serial peripheral interface. Specifically, the first inertial sensor 10 is electrically coupled to the digital interface bus BS via the terminal TCS1, the terminal TCK1, the terminal TDI1, and the terminal TDO1. The second inertial sensor 20 is electrically coupled to the digital interface bus BS via the terminal TCS2, the terminal TCK2, the terminal TDI2, and the terminal TDO2. The operation circuit 30 is electrically coupled to the digital interface bus BS via a terminal TMCS, a terminal TMCK, a terminal TMDO, and a terminal TMDI. Here, the electrical coupling refers to coupling in which an electrical signal can be transmitted, and refers to coupling in which information can be transmitted by the electrical signal. The digital interface bus BS may be a bus conforming to an I2C communication standard, a communication standard developed from SPI or I2C, a communication standard obtained in which a part of the SPI or I2C standard is improved or modified, or the like. The I2C is an abbreviation for inter-integrated circuit.

The operation circuit 30 is a controller serving as a master for the first inertial sensor 10 and the second inertial sensor 20. The operation circuit 30 is an integrated circuit device, and is implemented by a processor such as an MPU or a CPU. Alternatively, the operation circuit 30 may be implemented by an ASIC using automatic placement and routing such as a gate array.

The operation circuit 30 outputs a chip select signal XMCS from the terminal TMCS, outputs a serial clock signal MSCLK from the terminal TMCK, and outputs a serial data signal MSDI from the terminal TMDO. The interface circuit 122 performs interface processing of the SPI communication standard based on the chip select signal XMCS received from the terminal TCS1, the serial clock signal MSCLK received from the terminal TCK1, and the serial data signal MSDI received from the terminal TDI1. When the serial data signal MSDI is a read command of the first detection data SD1, the interface circuit 122 outputs the first detection data SD1 to the terminal TDO1. The interface circuit 272 performs interface processing of the SPI communication standard based on the chip select signal XMCS received from the terminal TCS2, the serial clock signal MSCLK received from the terminal TCK2, and the serial data signal MSDI received from the terminal TDI2. When the serial data signal MSDI is a read command of the second detection data SD2, the interface circuit 272 outputs the second detection data SD2 to the terminal TDO2. The first detection data SD1 output from the terminal TDO1 of the first inertial sensor 10 and the second detection data SD2 output from the terminal TDO2 of the second inertial sensor 20 are input to the terminal TMDI of the operation circuit 30 as a serial data signal MSDO.

When receiving the external synchronization signal EXSYC from a terminal TSYC, the operation circuit 30 reads the first detection data SD1 and the second detection data SD2, and performs various operations on the first detection data SD1 and the second detection data SD2. Specifically, the operation circuit 30 performs a downsampling operation, a filter operation, a correction operation, and the like on the first detection data SD1 and the second detection data SD2. For example, for one of the correction operations, the operation circuit 30 performs a temperature correction operation on the first detection data SD1 and the second detection data SD2 based on a temperature signal TMPO received from a terminal TSEN. The temperature signal TMPO is output from the temperature sensor 40. For example, the temperature signal TMPO may be a digital signal whose frequency changes in accordance with the temperature, or may be a digital signal obtained by A/D converting an analog signal whose voltage changes in accordance with the temperature. Alternatively, the temperature sensor 40 may output the temperature signal TMPO whose voltage changes in accordance with the temperature, and the operation circuit 30 may convert the temperature signal TMPO into a digital signal by a built-in A/D conversion circuit to perform the temperature correction operation. The temperature sensor 40 may be provided in the first inertial sensor 10 or the second inertial sensor 20.

The operation circuit 30 generates an output signal of the first axis based on the detection signal of the first axis output from the first inertial sensor 10 by the operation on the first detection data SD1. The operation circuit 30 generates an output signal of the second axis based on the detection signal of the second axis output from the second inertial sensor 20 and an output signal of the third axis based on the detection signal of the third axis output from the second inertial sensor 20 by the operation on the second detection data SD2. The operation circuit 30 outputs the output signal of the first axis, the output signal of the second axis, and the output signal of the third axis to the outside in synchronization with one another. Specifically, the operation circuit 30 generates third-axis output data including the output signal of the first axis, the output signal of the second axis, and the output signal of the third axis, which are synchronized with one another, and outputs the third-axis output data to a host device (not shown).

In the present embodiment, the operation circuit 30 is electrically coupled to the host device via a terminal TR, a terminal THCS, a terminal THCK, a terminal THDI, and a terminal THDO. The host device is a controller serving as a master for the operation circuit 30. Upon completion of the generation of the third-axis output data, the operation circuit 30 outputs a signal DRDY indicating the completion of preparation of the third-axis output data from the terminal TR to the host device. When receiving the signal DRDY, the host device outputs a chip select signal XHCS, a serial clock signal HSCLK, and a serial data signal HSDI in accordance with the SPI communication standard to the operation circuit 30. The serial data signal HSDI is a read command of three-axis output data. The operation circuit 30 performs interface processing of the SPI communication standard based on the chip select signal XHCS received from the terminal THCS, the serial clock signal HSCLK received from the terminal THCK, and the serial data signal HSDI received from the terminal THDI, and outputs the third-axis output data to the terminal THDO. The third-axis output data output from the terminal THDO of the operation circuit 30 is input to the host device as a serial data signal HSDO.

Figure 2:
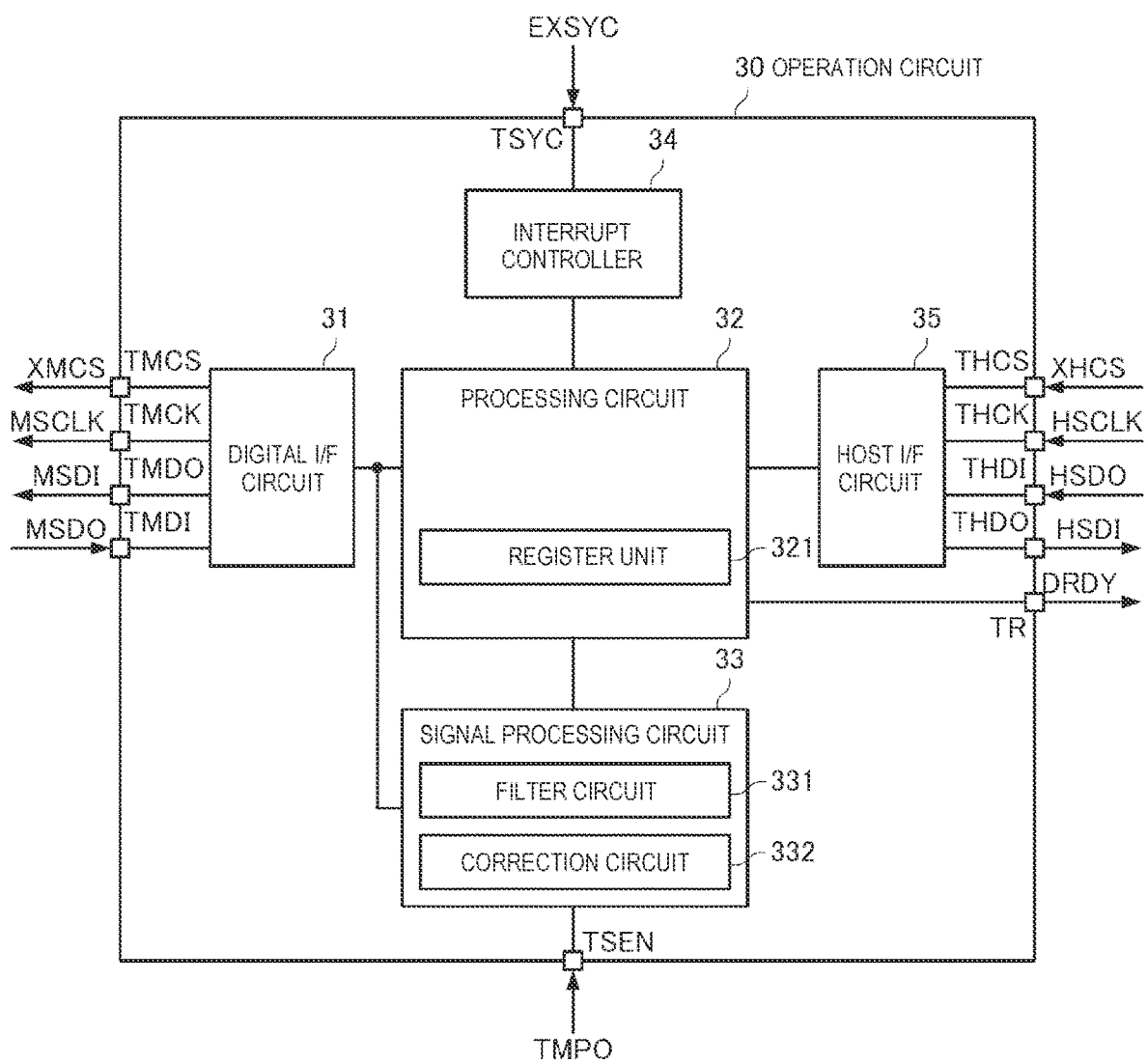
FIG. 2 is a diagram showing a configuration example of an operation circuit.

FIG. 2 is a diagram showing a configuration example of the operation circuit 30. As shown in FIG. 2, the operation circuit 30 includes a digital interface circuit 31, a processing circuit 32, a signal processing circuit 33, an interrupt controller 34, and a host interface circuit 35.

The digital interface circuit 31 is a circuit that performs interface processing with the first inertial sensor 10 and the second inertial sensor 20. That is, the digital interface circuit 31 performs interface processing as a master between the interface circuit 122 and the interface circuit 272. The digital interface circuit 31 is coupled to the digital interface bus BS via the terminal TMCS, the terminal TMCK, the terminal TMDO, and the terminal TMDI. In the present embodiment, the digital interface circuit 31 performs interface processing of the SPI communication standard, similarly to the interface circuit 122 and the interface circuit 272. The digital interface circuit 31 may perform interface processing of, for example, an I2C communication standard, a communication standard developed from SPI or I2C, or a communication standard in which a part of the SPI or I2C standard is improved or modified. The digital interface bus BS and the digital interface circuit 31 may be commonly provided in the first inertial sensor 10 and the second inertial sensor 20, or may be provided in each of the first inertial sensor 10 and the second inertial sensor 20.

The host interface circuit 35 is a circuit that performs interface processing with the host device. That is, the host interface circuit 35 performs interface processing as a slave with the host device. The host interface circuit 35 performs interface processing of the SPI communication standard on the host device via the terminal THCS, the terminal THCK, the terminal THDO, and the terminal THDI. The host interface circuit 35 may perform interface processing of, for example, an I2C communication standard, a communication standard developed from SPI or I2C, or a communication standard in which a part of the SPI or I2C standard is improved or modified.

The processing circuit 32 is a circuit corresponding to a core CPU of the operation circuit 30, and executes various operations and controls. The processing circuit 32 includes a register unit 321 including various registers.

The signal processing circuit 33 is a circuit that performs digital signal processing such as various operations, and is implemented by a DSP or the like. The DSP is an abbreviation for digital signal processor. In the present embodiment, the signal processing circuit 33 includes a filter circuit 331 and a correction circuit 332. The filter circuit 331 performs a filter operation for reducing unnecessary signal components on the first detection data SD1 and the second detection data SD2. The correction circuit 332 performs various correction operations. For example, the correction circuit 332 performs a temperature correction operation on the first detection data SD1 and the second detection data SD2 based on the temperature signal TMPO received from the terminal TSEN and a temperature correction table stored in a memory (not shown). The correction circuit 332 may perform correction operations such as zero-point correction, sensitivity correction, and nonlinearity correction on the first detection data SD1 and the second detection data SD2. The signal processing circuit 33 may perform an operation of calculating a moving average of latest J pieces of the first detection data SD1 and the second detection data SD2 and then down-sampling the moving average to a rate of 1/K. J and K are integers of 2 or more.

The processing circuit 32 generates the third-axis output data including the output signal of the first axis, the output signal of the second axis, and the output signal of the third axis, which are synchronized with one another, based on the first detection data SD1 and the second detection data SD2 after the operation by the signal processing circuit 33, and stores the third-axis output data in a data register of the register unit 321. Further, the processing circuit 32 generates the signal DRDY indicating the completion of preparation of the third-axis output data, and outputs the signal DRDY to the host device via the terminal TR.

The register unit 321 includes a plurality of registers accessible by the host device. For example, the host device outputs the chip select signal XHCS and the serial clock signal HSCLK to the terminal THCS and the terminal THCK, respectively, and outputs the serial data signal HSDO, which is a read command of the third-axis output data, to the terminal THDI. Therefore, the host device can access the data register of the register unit 321 via the host interface circuit 35 and read the third-axis output data output as the serial data signal HSDI from the terminal THDO. The processing circuit 32 counts an update count of the data register of the third-axis output data, and writes the obtained update count to an update count register of the register unit 321. By reading the update count stored in the update count register together with the third-axis output data, the host device can specify the number of the read third-axis output data.

The interrupt controller 34 receives various interrupt requests. The interrupt controller 34 outputs a signal indicating an interrupt request, an interrupt level, and a vector number to the processing circuit 32 according to a priority and the interrupt level. When receiving the external synchronization signal EXSYC as one of interrupt request signals via the terminal TSYC, and the interrupt request by the external synchronization signal EXSYC, the interrupt controller 34 executes corresponding interruption.

The operation circuit 30 may generate a first output signal of the first axis based on the detection signal of the first axis output from the first inertial sensor 10 by the operation on the first detection data SD1, and may generate a second output signal of the first axis based on the detection signal of the first axis output from the second inertial sensor 20, the output signal of the second axis based on the detection signal of the second axis output from the second inertial sensor 20, and the output signal of the third axis based on the detection signal of the third axis output from the second inertial sensor 20 by the operation on the second detection data SD2. The operation circuit 30 outputs the first output signal of the first axis, the second output signal of the first axis, the output signal of the second axis, and the output signal of the third axis to the outside in synchronization with one another. Specifically, the operation circuit 30 generates four-axis output data including the first output signal of the first axis, the second output signal of the first axis, the output signal of the second axis, and the output signal of the third axis, which are synchronized with one another, and outputs the four-axis output data to the host device. The host device performs various operations using the first output signal of the first axis, the output signal of the second axis, and the output signal of the third axis included in the four-axis output data.

Figure 3:
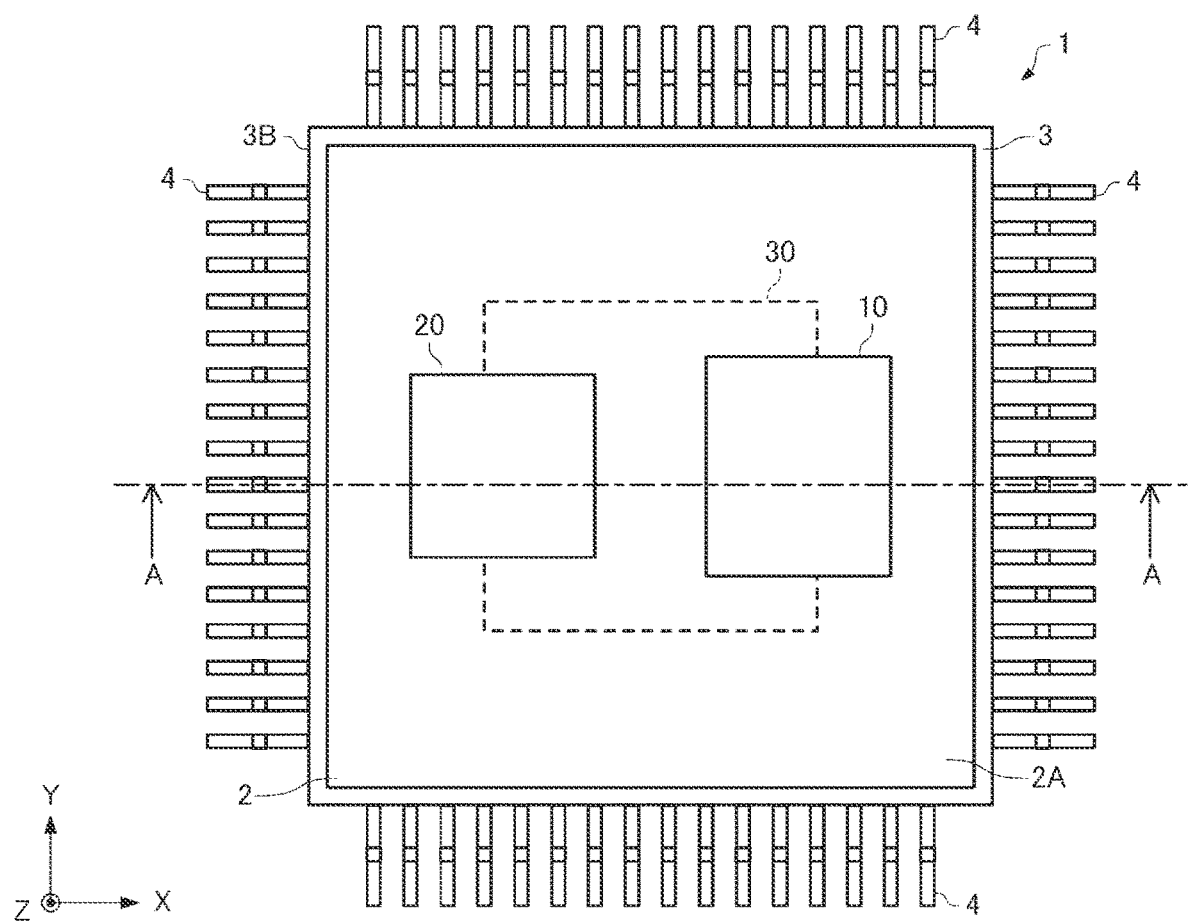
FIG. 3 is a plan view of the inertial sensor module.
Figure 4:
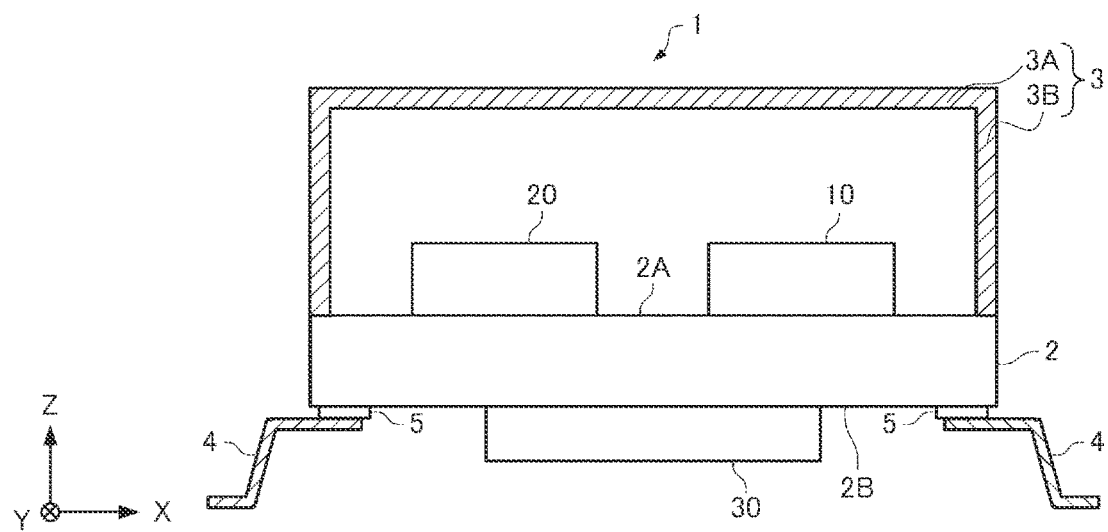
FIG. 4 is a cross-sectional view of the inertial sensor module taken along a line A-A of FIG. 3.
Figure 5:
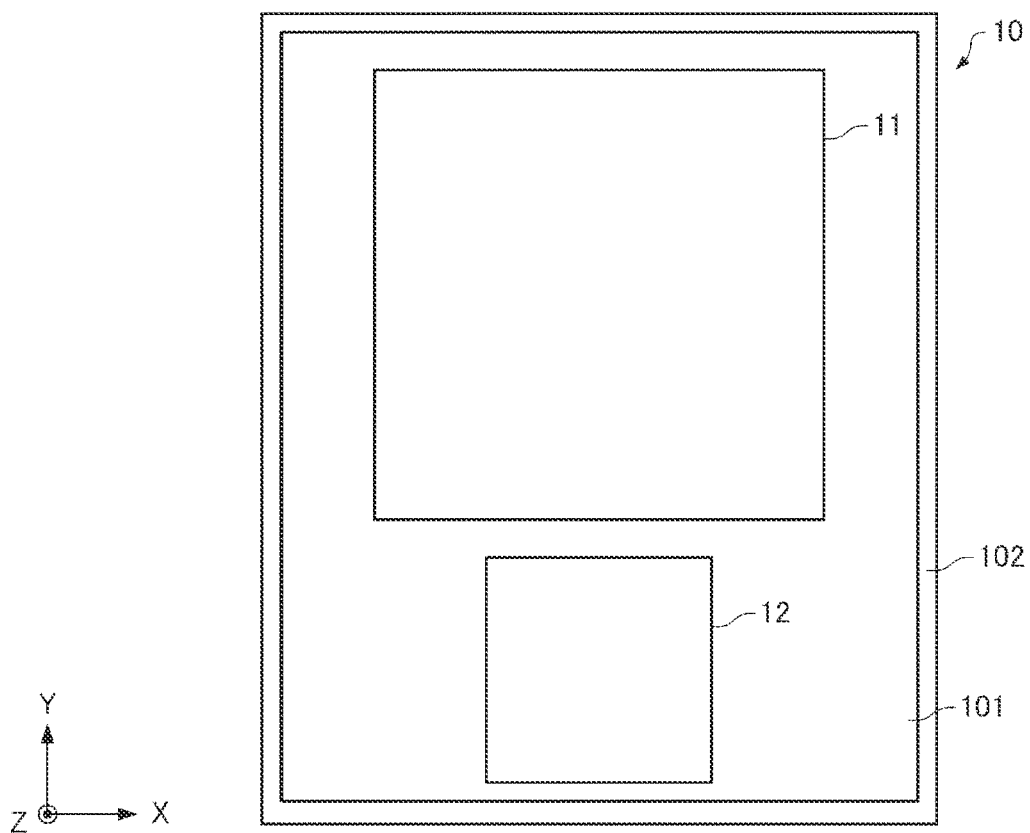
FIG. 5 is a plan view of a first inertial sensor.
Figure 6:
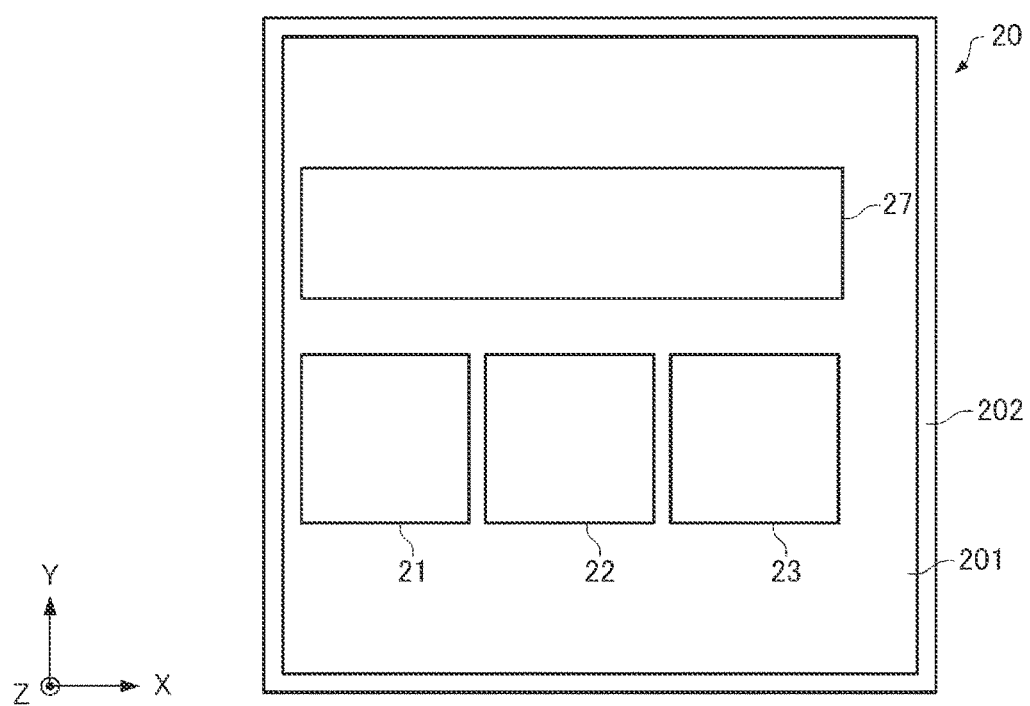
FIG. 6 is a plan view of a second inertial sensor.

FIGS. 3 to 6 are views showing an example of a structure of the inertial sensor module 1 according to the present embodiment. FIG. 3 is a plan view of the inertial sensor module 1. FIG. 4 is a cross-sectional view of the inertial sensor module 1 taken along a line A-A of FIG. 3. FIG. 5 is a plan view of the first inertial sensor 10. FIG. 6 is a plan view of the second inertial sensor 20. For convenience of description of an internal configuration of the inertial sensor module 1, FIG. 3 shows a state in which a top plate portion 3A of a metal cap 3 is removed. In FIG. 5, for convenience of description of the internal configuration of the first inertial sensor 10, components other than the sensor element 11 and the processing circuit 12 are not shown. Similarly, in FIG. 6, for convenience of description of the internal configuration of the second inertial sensor 20, components other than the first sensor element 21, the second sensor element 22, the third sensor element 23, and the processing circuit 27 are not shown. A dimensional ratio of each component in each drawing is different from the actual one.

Hereinafter, three axes orthogonal to one another will be described as the X-axis, the Y-axis, and the Z-axis. A direction along the X-axis is defined as an "X direction", a direction along the Y-axis is defined as a "Y direction", and a direction along the Z-axis is defined as a "Z direction", in each of which a direction indicated by an arrow is a plus direction. In addition, the plus direction in the Z direction is referred to as "up" or "upward", and a minus direction in the Z direction is referred to as "down" or "downward". Further, in a plan view from the Z direction, a surface at a plus side in the Z direction is referred to as an upper surface, and a surface at a minus side in the Z direction which is at an opposite side from the upper surface is referred to as a lower surface. The Z-axis is an example of the first axis, the X-axis is an example of the second axis, and the Y-axis is an example of the third axis.

As shown in FIGS. 3 and 4, the inertial sensor module 1 includes a printed circuit board 2, the metal cap 3 bonded to a main surface 2A which is an upper surface of the printed circuit board 2, the first inertial sensor 10 and the second inertial sensor 20 that are provided on the main surface 2A of the printed circuit board 2 and that are accommodated between the main surface 2A and the metal cap 3, the operation circuit 30 that is an integrated circuit device and is mounted on a lower surface 2B of the printed circuit board 2, and a plurality of lead terminals 4 electrically coupled to the lower surface 2B of the printed circuit board 2.

The printed circuit board 2 has a rectangular plate shape in the plan view from the Z direction orthogonal to the main surface 2A of the printed circuit board 2. As the printed circuit board 2, for example, a ceramic substrate or a glass epoxy substrate can be used. In FIGS. 3 and 4, a wiring formed on the printed circuit board 2 is not shown.

As shown in FIGS. 3 and 4, the metal cap 3 is bonded to the main surface 2A of the printed circuit board 2 via an adhesive member (not shown). The metal cap 3 includes the top plate portion 3A and a side wall 3B extending downward from an outer peripheral edge of the top plate portion 3A, and has a rectangular shape substantially similar to the shape of the printed circuit board 2 in the plan view from the Z direction. The metal cap 3 may be formed of, for example, a 42 alloy which is an iron-nickel alloy.

The first inertial sensor 10 and the second inertial sensor 20 are provided on the main surface 2A of the printed circuit board 2. Since the metal cap 3 is bonded to the main surface 2A of the printed circuit board 2, the first inertial sensor 10 and the second inertial sensor 20 are accommodated between the main surface 2A of the printed circuit board 2 and the metal cap 3. In this manner, in the present embodiment, the first inertial sensor 10 and the second inertial sensor 20 are separated from each other.

As shown in FIGS. 3 and 4, the operation circuit 30, which is an integrated circuit device, is mounted on the lower surface 2B of the printed circuit board 2. The operation circuit 30 is electrically coupled to the first inertial sensor 10 and the second inertial sensor 20 via the wiring (not shown) provided on the printed circuit board 2. The operation circuit 30 is obtained by, for example, molding a bare chip which is a semiconductor chip.

An external coupling terminal 5 electrically coupled to the operation circuit 30 via the wiring (not shown) is provided on the lower surface 2B of the printed circuit board 2. Further, the plurality of lead terminals 4 are provided on the lower surface 2B of the printed circuit board 2 along four sides of the printed circuit board 2. Each lead terminal 4 is electrically coupled to the external coupling terminal 5 via a conductive bonding member such as solder (not shown).

The first inertial sensor 10 is a one-axis inertial sensor that detects a physical quantity of a desired detection axis among the three axes of the X-axis, the Y-axis, and the Z-axis with high accuracy. Here, it is assumed that the first inertial sensor 10 detects the angular velocity around the Z-axis. As shown in FIG. 5, the first inertial sensor 10 has a rectangular profile in the plan view from the Z direction. The first inertial sensor 10 includes a printed circuit board 101, the sensor element 11 mounted on the printed circuit board 101 and having the first axis as the detection axis, the processing circuit 12 that is an integrated circuit device and is mounted on the printed circuit board 101, and a package 102 accommodating the printed circuit board 101 on which the sensor element 11 and the processing circuit 12 are mounted. The sensor element 11 detects the angular velocity around the Z-axis which is the first axis. The sensor element 11 and the processing circuit 12 are electrically coupled to each other. In FIG. 5, a wiring formed on an upper surface of the package 102 and the printed circuit board 101 is not shown.

The second inertial sensor 20 is a three-axis inertial sensor that detects a physical quantity with the three axes of the X-axis, the Y-axis, and the Z-axis as detection axes. Here, it is assumed that the second inertial sensor 20 detects the angular velocity around the X-axis, the angular velocity around the Y-axis, and the angular velocity around the Z-axis. As shown in FIG. 6, the second inertial sensor 20 has a rectangular profile in the plan view from the Z direction. The second inertial sensor 20 includes a silicon substrate 201, the first sensor element 21 formed on the silicon substrate 201 and having the first axis as the detection axis, the second sensor element 22 formed on the silicon substrate 201 and having the second axis as the detection axis, the third sensor element 23 formed on the silicon substrate 201 and having the third axis as the detection axis, the processing circuit 27 that is an integrated circuit and is formed on the silicon substrate 201, and a package 202 accommodating the silicon substrate 201 on which the first sensor element 21, the second sensor element 22, the third sensor element 23, and the processing circuit 27 are formed. The first sensor element 21 detects the angular velocity around the Z-axis which is the first axis. The second sensor element 22 detects the angular velocity around the X-axis which is the second axis. The third sensor element 23 detects the angular velocity around the Y-axis which is the third axis. The first sensor element 21, the second sensor element 22, and the third sensor element 23 are electrically coupled to the processing circuit 27. In FIG. 6, a wiring formed on an upper surface of the package 202 and the silicon substrate 201 is not shown.

Here, in the present embodiment, detection accuracy of the first inertial sensor 10 is higher than the detection accuracy of the second inertial sensor 20. For example, the sensor element 11 included in the first inertial sensor 10 is an element made of crystal, whereas the first sensor element 21, the second sensor element 22, and the third sensor element 23 included in the second inertial sensor 20 are elements formed of the silicon substrate 201 using a MEMS technique. Since the first inertial sensor 10 including the sensor element 11 has high frequency-temperature characteristics and high frequency stability and low noise and jitter, the first inertial sensor 10 is more expensive but has higher detection accuracy as compared with the second inertial sensor 20 including the first sensor element 21, the second sensor element 22, and the third sensor element 23.

In the present embodiment, a detection signal detected by the first inertial sensor 10 having detection accuracy higher than that of the second inertial sensor 20 is used for the angular velocity around the Z-axis that requires particularly high detection accuracy, and a detection signal detected by the inexpensive second inertial sensor 20 having detection accuracy lower than that of the first inertial sensor 10 is used for the angular velocity around the X-axis and the angular velocity around the Y-axis that may require relatively low detection accuracy as compared with the angular velocity around the Z-axis. That is, the operation circuit 30 generates third-axis output data including an output signal of the Z-axis based on a detection signal of the Z-axis output from the first inertial sensor 10, an output signal of the X-axis based on a detection signal of the X-axis output from the second inertial sensor 20, and an output signal of the Y-axis based on a detection signal of the Y-axis output from the second inertial sensor 20, and outputs the third-axis output data to the host device. Alternatively, the operation circuit 30 generates four-axis output data including a first output signal of the Z-axis based on a detection signal of the Z-axis output from the first inertial sensor 10, a second output signal of the Z-axis based on a detection signal of the Z-axis output from the second inertial sensor 20, an output signal of the X-axis based on a detection signal of the X-axis output from the second inertial sensor 20, and an output signal of the Y-axis based on a detection signal of the Y-axis output from the second inertial sensor 20, and outputs the four-axis output data to the host device. The host device performs various operations using the first output signal of the Z-axis, the output signal of the X-axis, and the output signal of the Y-axis included in the four-axis output data.

The first inertial sensor 10 having high detection accuracy may be a quartz crystal sensor that detects an angular velocity around two or more axes, and in the present embodiment, the first inertial sensor 10 only detects an angular velocity around one axis in order to reduce a cost. The second inertial sensor 20 does not necessarily detect an angular velocity around the first axis, and the second inertial sensor 20 detects angular velocities around three axes in the present embodiment since a silicon MEMS sensor that detects angular velocities around three axes is in large demand and can be obtained at a low cost.

As described above, according to the inertial sensor module 1 in the first embodiment, since the detection accuracy of the first inertial sensor 10 is higher than the detection accuracy of the second inertial sensor 20, high detection accuracy for the first axis can be achieved by the first inertial sensor 10.

According to the inertial sensor module 1 in the first embodiment, since the second inertial sensor 20 is a silicon MEMS sensor, a manufacturing cost of the second inertial sensor 20 is reduced, and cost reduction is achieved.

According to the inertial sensor module 1 in the first embodiment, since the first inertial sensor 10 has the first axis as the detection axis, and the second inertial sensor 20 has the first axis, the second axis, and the third axis as the detection axes, output signals of three axes in which the accuracy of the output signal of the first axis is higher than the accuracy of each of the output signals of the second axis and the third axis is obtained. Therefore, by using the inertial sensor module 1 according to the first embodiment, it is possible to implement a system in which higher detection accuracy is required for a specific one axis than the other two axes while preventing unnecessary costs.

2. Second Embodiment

Hereinafter, in a second embodiment, the same components as those in the first embodiment are denoted by the same reference numerals, the description overlapping with the first embodiment is omitted or simplified, and contents different from those in the first embodiment will be mainly described.

Since a functional configuration of the inertial sensor module 1 according to the second embodiment is the same as that in FIG. 1, the illustration thereof is omitted. Since a structure of the inertial sensor module 1 according to the second embodiment is the same as that in FIGS. 3 to 6, the illustration thereof is omitted. The inertial sensor module 1 according to the second embodiment is different from the inertial sensor module 1 according to the first embodiment in a function and a configuration of the operation circuit 30.

In the second embodiment, the operation circuit 30 determines whether a failure may have occurred in the first inertial sensor 10 based on the detection signal of the first axis output from the first inertial sensor 10 and the detection signal of the first axis output from the second inertial sensor 20. For example, the operation circuit 30 may compare the detection signal of the first axis output from the first inertial sensor 10 with the detection signal of the first axis output from the second inertial sensor 20, and determines whether a failure may have occurred in the first inertial sensor 10 based on the comparison result. For example, when a state in which a difference between the detection signal of the first axis output from the first inertial sensor 10 and the detection signal of the first axis output from the second inertial sensor 20 is not within a predetermined range continues for a predetermined time or more, the operation circuit 30 may determine that a failure may have occurred in the first inertial sensor 10.

Figure 7:
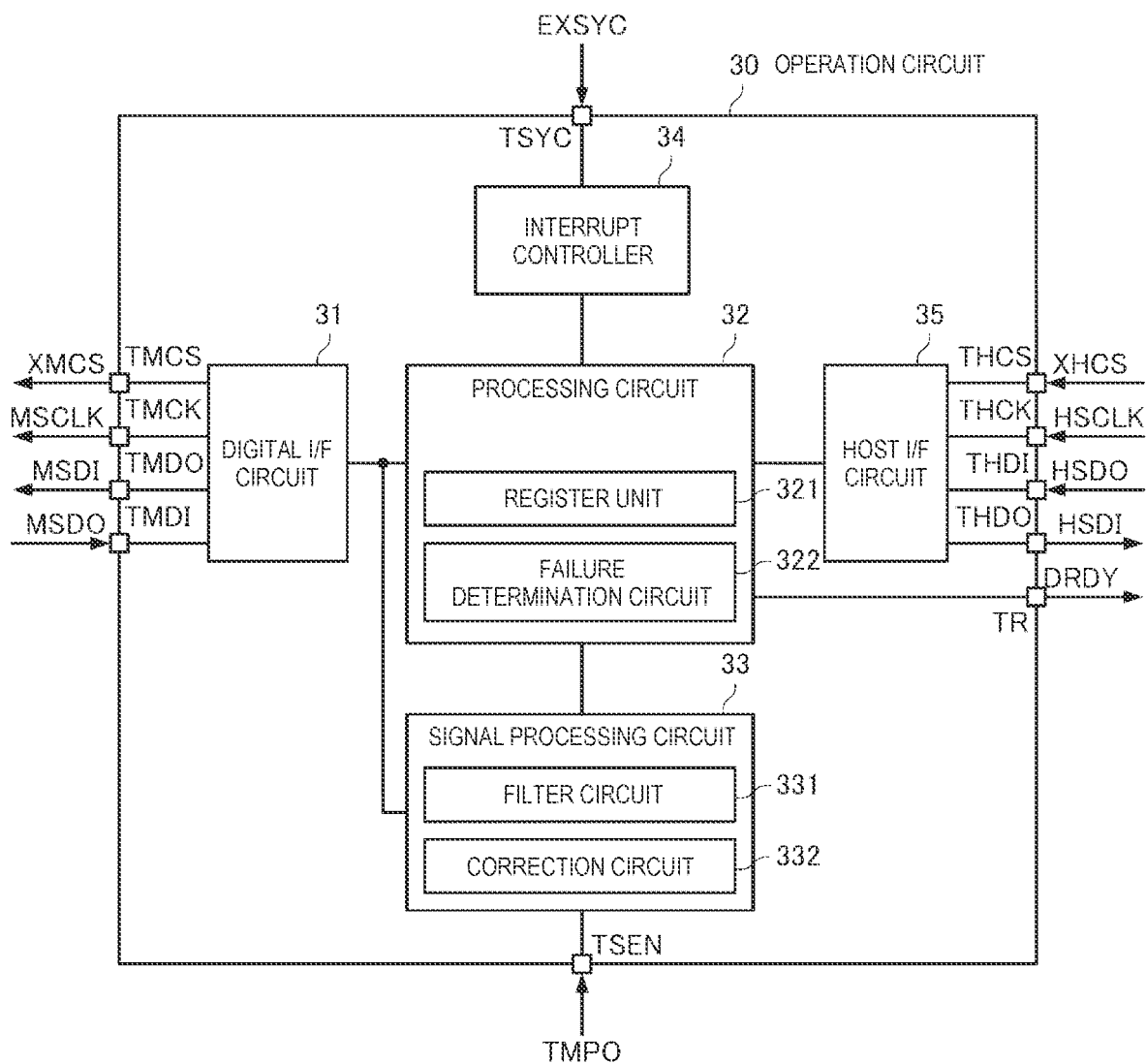
FIG. 7 is a diagram showing a configuration example of an operation circuit according to a second embodiment.

FIG. 7 is a diagram showing a configuration example of the operation circuit 30 included in the inertial sensor module 1 according to the second embodiment. As shown in FIG. 7, as in the first embodiment, the operation circuit 30 according to the second embodiment includes the digital interface circuit 31, the processing circuit 32, the signal processing circuit 33, the interrupt controller 34, and the host interface circuit 35. Since the functions of the digital interface circuit 31, the signal processing circuit 33, the interrupt controller 34, and the host interface circuit 35 are the same as those in the first embodiment, the description thereof will be omitted.

In the present embodiment, the processing circuit 32 includes the register unit 321 and a failure determination circuit 322. The failure determination circuit 322 determines whether a failure may have occurred in the first inertial sensor 10 based on the detection signal of the first axis included in the first detection data SD1 output from the first inertial sensor 10 and the detection signal of the first axis included in the second detection data SD2 output from the second inertial sensor 20.

Specifically, the failure determination circuit 322 compares the detection signal of the first axis included in the first detection data SD1 after the operation by the signal processing circuit 33 with the detection signal of the first axis included in the second detection data SD2 after the operation by the signal processing circuit 33, and determines whether a failure may have occurred in the first inertial sensor 10 based on the comparison result. For example, the failure determination circuit 322 may determine that no failure has occurred in the first inertial sensor 10 when the difference between the detection signal of the first axis included in the first detection data SD1 and the detection signal of the first axis included in the second detection data SD2 is within the predetermined range, and may determine that a failure may have occurred in the first inertial sensor 1 when the state in which the difference is not within the predetermined range continues for the predetermined time or more. The failure determination circuit 322 may compare a detection signal of the first axis included in the first detection data SD1 before the operation by the signal processing circuit 33 with a detection signal of the first axis included in the second detection data SD2 before the operation by the signal processing circuit 33, and determines whether a failure may have occurred in the first inertial sensor 10 based on the comparison result.

When determining that no failure has occurred in the first inertial sensor 10, the failure determination circuit 322 stores a value indicating that no failure has occurred in the first inertial sensor 10, for example, 0 in a predetermined bit of a flag register of the register unit 321. When determining that a failure may have occurred in the first inertial sensor 10, the failure determination circuit 322 stores a value indicating that a failure may have occurred in the first inertial sensor 10, for example, 1 in the predetermined bit of the flag register of the register unit 321. The host device can access the flag register of the register unit 321 via the host interface circuit 35, read data output as the serial data signal HSDI from the terminal THDO, and recognize whether a failure may have occurred in the first inertial sensor 10 based on the value of the predetermined bit of the data. For example, when a failure may have occurred in the first inertial sensor 10, the host device may not perform a part of the normal processing assuming that the reliability of the third-axis output data is low, or may perform special processing.

Since the other functions of the processing circuit 32 are the same as those in the first embodiment, the description thereof will be omitted.

The inertial sensor module 1 according to the second embodiment described above has the same effect as the inertial sensor module 1 according to the first embodiment.

Further, in the inertial sensor module 1 according to the second embodiment, the operation circuit 30 determines whether a failure may have occurred in the first inertial sensor 10 based on the detection signal of the first axis output from the first inertial sensor 10 and the detection signal of the first axis output from the second inertial sensor 20. Since the first inertial sensor 10 and the second inertial sensor 20 have different structures from each other, the probability of failure at the same time is fairly low. Therefore, the operation circuit 30 can determine whether a failure may have occurred in the first inertial sensor 10 by comparing the detection signal of the first axis output from the first inertial sensor 10 with the detection signal of the first axis output from the second inertial sensor 20. Therefore, the host device can recognize the reliability of the output signal of the first axis output from the inertial sensor module 1 based on the determination result.

3. Third Embodiment

Hereinafter, in a third embodiment, the same components as those in the first embodiment or the second embodiment are denoted by the same reference numerals, repetitive description as that in the first embodiment or the second embodiment is omitted or simplified, and contents different from those in the first embodiment or the second embodiment will be mainly described.

Since a functional configuration of the inertial sensor module 1 according to the third embodiment is the same as that in FIG. 1, the illustration thereof is omitted. Since a structure of the inertial sensor module 1 according to the third embodiment is the same as that in FIGS. 3 to 6, the illustration thereof is omitted. The inertial sensor module 1 according to the third embodiment is different from the inertial sensor module 1 according to the first embodiment and the second embodiment in a function and a configuration of the operation circuit 30.

In the third embodiment, the operation circuit 30 performs an operation based on the detection signal of the first axis output from the first inertial sensor 10, the detection signal of the second axis output from the second inertial sensor 20, and the detection signal of the third axis output from the second inertial sensor 20. For example, when the detection signal of the first axis is a detection signal of the angular velocity around the first axis, the detection signal of the second axis is a detection signal of an angular velocity around the second axis, and the detection signal of the third axis is a detection signal of an angular velocity around the third axis, the operation circuit 30 may perform an operation of calculating a posture of the inertial sensor module 1. For example, when the detection signal of the first axis is a detection signal of an acceleration in a first axis direction, the detection signal of the second axis is a detection signal of an acceleration in a second axis direction, and the detection signal of the third axis is a detection signal of an acceleration in a third axis direction, the operation circuit 30 may perform an operation of calculating a position of the inertial sensor module 1.

Figure 8:
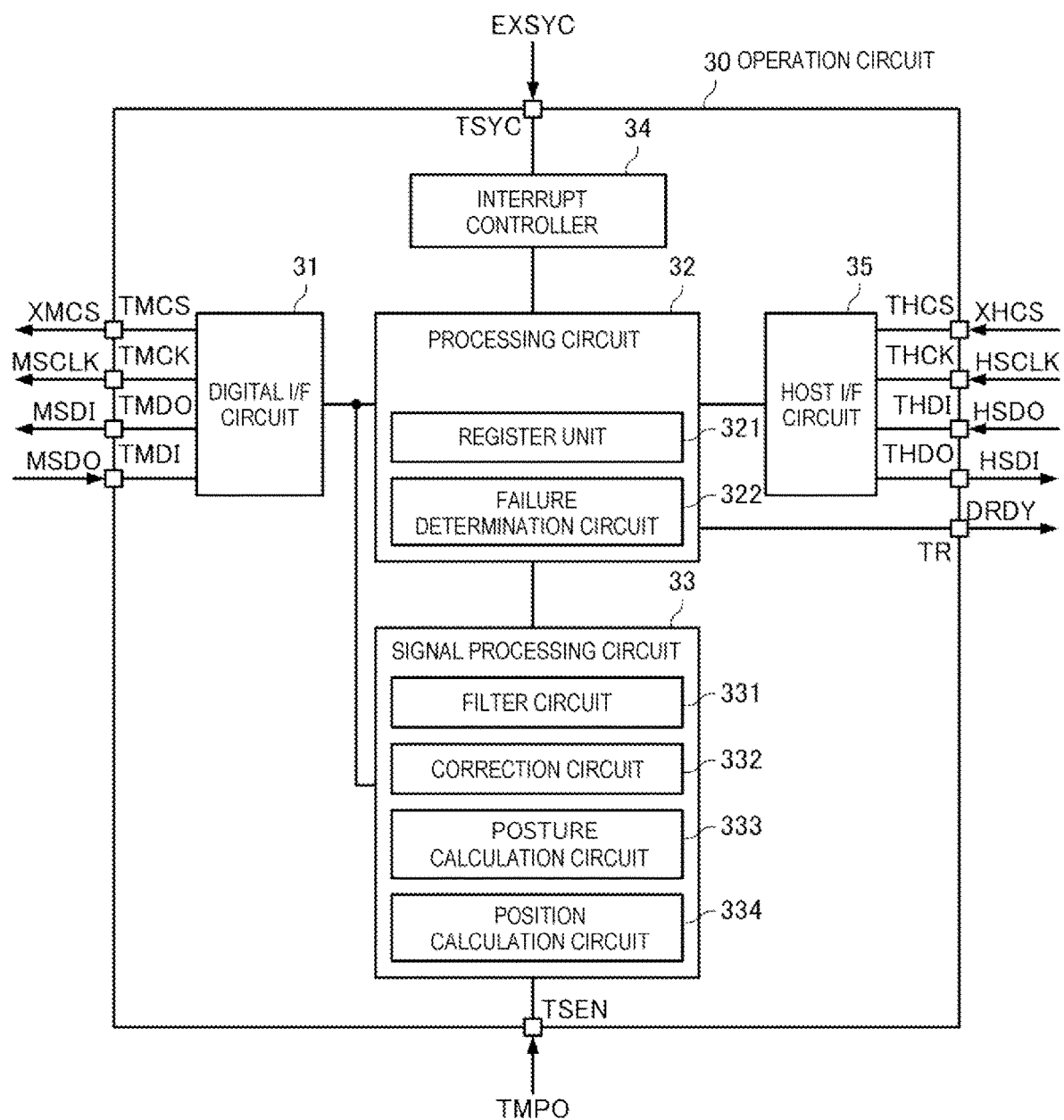
FIG. 8 is a diagram showing a configuration example of an operation circuit according to a third embodiment.

FIG. 8 is a diagram showing a configuration example of the operation circuit 30 included in the inertial sensor module 1 according to the third embodiment. As shown in FIG. 8, as in the first embodiment or the second embodiment, the operation circuit 30 according to the third embodiment includes the digital interface circuit 31, the processing circuit 32, the signal processing circuit 33, the interrupt controller 34, and the host interface circuit 35. Since the functions of the digital interface circuit 31, the interrupt controller 34, and the host interface circuit 35 are the same as those in the first embodiment or the second embodiment, the description thereof will be omitted.

In the present embodiment, as in the first embodiment, the signal processing circuit 33 includes the filter circuit 331 and the correction circuit 332. The signal processing circuit 33 may further include a posture calculation circuit 333. The posture calculation circuit 333 calculates the posture of the inertial sensor module 1 based on the detection signal of the first axis included in the first detection data SD1, the detection signal of the second axis included in the second detection data SD2, and the detection signal of the third axis included in the second detection data SD2. The signal processing circuit 33 may further include a position calculation circuit 334. The position calculation circuit 334 calculates the position of the inertial sensor module 1 based on the detection signal of the first axis included in the first detection data SD1, the detection signal of the second axis included in the second detection data SD2, and the detection signal of the third axis included in the second detection data SD2.

The processing circuit 32 stores, in a posture register of the register unit 321, data about the posture of the inertial sensor module 1 calculated by the signal processing circuit 33. The processing circuit 32 stores, in a position register of the register unit 321, data about the position of the inertial sensor module 1 calculated by the signal processing circuit 33. The host device can access the posture register or the position register of the register unit 321 via the host interface circuit 35, read the data output as the serial data signal HSDI from the terminal THDO, and recognize the posture or position of the inertial sensor module 1. For example, the host device may control a posture or position of an object on which the inertial sensor module 1 is mounted based on the posture or position of the inertial sensor module 1.

Since the other functions of the processing circuit 32 and the signal processing circuit 33 are the same as those in the first embodiment or the second embodiment, the description thereof will be omitted.

The inertial sensor module 1 according to the third embodiment described above has the same effect as the inertial sensor module 1 according to the first embodiment or the second embodiment.

Further, in the inertial sensor module 1 according to the third embodiment, the operation circuit 30 performs an operation based on the detection signal of the first axis output from the first inertial sensor 10, the detection signal of the second axis output from the second inertial sensor 20, and the detection signal of the third axis output from the second inertial sensor 20. Therefore, since the accuracy of the detection signal of the first axis used for the operation is higher than the accuracy of the detection signal of the second axis and the accuracy of the detection signal of the third axis, when the inertial sensor module 1 is used in a system in which the detection accuracy of a specific one axis is important, the operation related to the three axes can be performed with high accuracy.

4. Fourth Embodiment

Hereinafter, in a fourth embodiment, since the same components as those in any one of the first embodiment to the third embodiment are denoted by the same reference numerals, repetitive description as that in any one of the first embodiment to the third embodiment is omitted or simplified, and contents different from those in any one of the first embodiment to the third embodiment will be mainly described.

Figure 9:
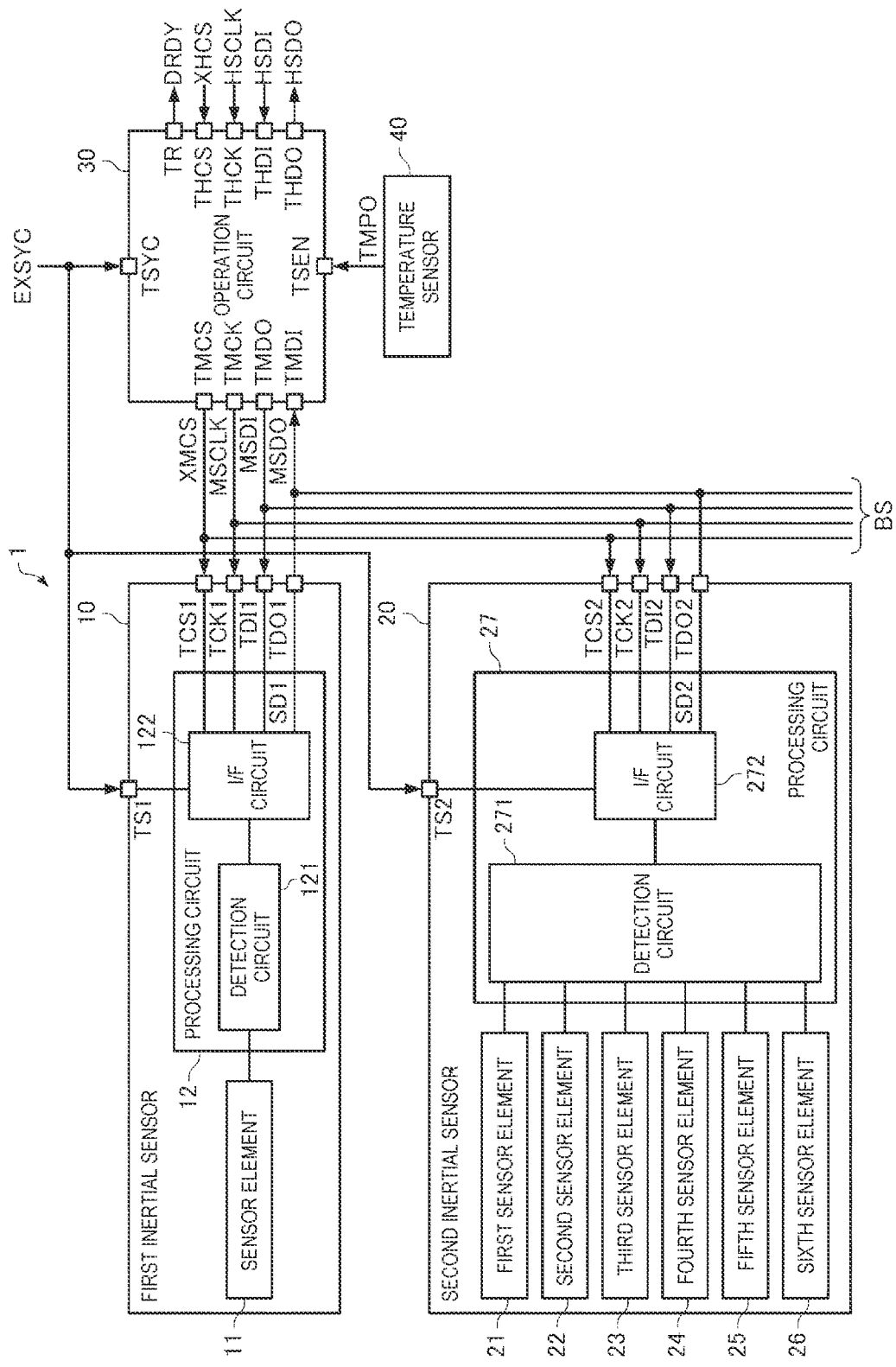
FIG. 9 is a diagram showing an example of a functional configuration of an inertial sensor module according to a fourth embodiment.

FIG. 9 is a diagram showing an example of a functional configuration of the inertial sensor module 1 according to the fourth embodiment. As shown in FIG. 9, as in the first embodiment, the second embodiment, or the third embodiment, the inertial sensor module 1 according to the fourth embodiment includes the first inertial sensor 10, the second inertial sensor 20, the operation circuit 30, and the temperature sensor 40. In the inertial sensor module 1, a part of components in FIG. 9 may be omitted or changed, or other components may be added.

In the fourth embodiment, a configuration of the second inertial sensor 20 is different from that in the first embodiment, the second embodiment, and the third embodiment. In the fourth embodiment, the second inertial sensor 20 is a sensor having the first axis, the second axis, and the third axis as detection axes and further having a fourth axis, a fifth axis, and a sixth axis as detection axes.

As shown in FIG. 9, the second inertial sensor 20 includes the first sensor element 21, the second sensor element 22, the third sensor element 23, a fourth sensor element 24, a fifth sensor element 25, a sixth sensor element 26, and the processing circuit 27. The second inertial sensor 20 is a device accommodating in a package thereof a silicon substrate on which the first sensor element 21, the second sensor element 22, the third sensor element 23, the fourth sensor element 24, the fifth sensor element 25, the sixth sensor element 26, and the processing circuit 27 are formed. Since the configurations and functions of the first sensor element 21, the second sensor element 22, and the third sensor element 23 are the same as those in the first embodiment, the second embodiment, or the third embodiment, the description thereof will be omitted.

The fourth sensor element 24 is a sensor element that detects a physical quantity with the fourth axis as a detection axis. The fifth sensor element 25 is a sensor element that detects a physical quantity with the fifth axis different from the fourth axis as a detection axis. The sixth sensor element 26 is a sensor element that detects a physical quantity using the sixth axis different from the fourth axis and the fifth axis as a detection axis. The physical quantities detected by the fourth sensor element 24, the fifth sensor element 25, the sixth sensor element 26 may be of the same type or different types from one another. The fourth axis, the fifth axis and the sixth axis may be the same axis as the first axis, the second axis and the third axis, respectively, or may be different axes. For example, the first sensor element 21 may detect the angular velocity around the Z-axis, the second sensor element 22 may detect the angular velocity around the X-axis, the third sensor element 23 may detect the angular velocity around the Y-axis, the fourth sensor element 24 may detect an acceleration in a Z-axis direction, the fifth sensor element 25 may detect the acceleration in the X-axis direction, and the sixth sensor element 26 may detect the acceleration in the Y-axis direction.

The processing circuit 27 performs physical quantity detection processing on signals output from the first sensor element 21, the second sensor element 22, the third sensor element 23, the fourth sensor element 24, the fifth sensor element 25, and the sixth sensor element 26, and outputs the second detection data SD2 obtained by the detection processing. The processing circuit 27 includes the detection circuit 271 that performs physical quantity detection processing on signals output from the first sensor element 21, the second sensor element 22, the third sensor element 23, the fourth sensor element 24, the fifth sensor element 25, and the sixth sensor element 26, and the interface circuit 272 that outputs the second detection data SD2 obtained by the detection processing of the detection circuit 121. For example, the detection circuit 271 may include six amplifier circuits that amplify signals output from the first sensor element 21, the second sensor element 22, the third sensor element 23, the fourth sensor element 24, the fifth sensor element 25, and the sixth sensor element 26, respectively, six wave detection circuits that detect output signals of the respective amplifier circuits, six gain adjustment circuits that adjust voltages of output signals of the respective wave detection circuits, six offset adjustment circuits that adjust offsets of output signals of the respective gain adjustment circuits, and an A/D conversion circuit that converts an output signal of each offset adjustment circuit into a digital signal in a time-division manner. The interface circuit 272 acquires the digital signal output from the A/D conversion circuit of the detection circuit 271 as the second detection data SD2 at the timing of the external synchronization signal EXSYC received from the terminal TCS2, and outputs the second detection data SD2 in accordance with a read command from the operation circuit 30. The second detection data SD2 includes the detection signal of the first axis obtained by the first sensor element 21, the detection signal of the second axis obtained by the second sensor element 22, the detection signal of the third axis obtained by the third sensor element 23, a detection signal of the fourth axis obtained by the fourth sensor element 24, a detection signal of the fifth axis obtained by the fifth sensor element 25, and a detection signal of the sixth axis obtained by the sixth sensor element 26.

The operation circuit 30 generates an output signal of the first axis based on the detection signal of the first axis output from the first inertial sensor 10 by an operation on the first detection data SD1. In addition, the operation circuit 30 generates an output signal of the second axis based on the detection signal of the second axis output from the second inertial sensor 20, an output signal of the third axis based on the detection signal of the third axis output from the second inertial sensor 20, an output signal of the fourth axis based on the detection signal of the fourth axis output from the second inertial sensor 20, an output signal of the fifth axis based on the detection signal of the fifth axis output from the second inertial sensor 20, and an output signal of the sixth axis based on the detection signal of the sixth axis output from the second inertial sensor 20 by an operation on the second detection data SD2. The operation circuit 30 generates six-axis output data including the output signal of the first axis, the output signal of the second axis, the output signal of the third axis, the output signal of the fourth axis, the output signal of the fifth axis, and the output signal of the sixth axis, which are synchronized with one another.

Upon completion of the generation of the six-axis output data, the operation circuit 30 outputs the signal DRDY indicating the completion of preparation of the six-axis output data from the terminal TR to the host device. When receiving the signal DRDY, the host device outputs the chip select signal XHCS, the serial clock signal HSCLK, and the serial data signal HSDI in accordance with the SPI communication standard to the operation circuit 30. The serial data signal HSDI is a read command of the six-axis output data. The operation circuit 30 performs interface processing of the SPI communication standard based on the chip select signal XHCS received from the terminal THCS, the serial clock signal HSCLK received from the terminal THCK, and the serial data signal HSDI received from the terminal THDI, and outputs the six-axis output data to the terminal THDO. The six-axis output data output from the terminal THDO of the operation circuit 30 is input to the host device as the serial data signal HSDO.

Further, as in the first embodiment, the second embodiment, or the third embodiment, the operation circuit 30 may perform a filter operation, correction operations such as temperature correction, zero-point correction, sensitivity correction, and nonlinearity correction, a downsampling operation, and the like on the first detection data SD1 and the second detection data SD2. As in the second embodiment or the third embodiment, the operation circuit 30 may determine whether a failure may have occurred in the first inertial sensor 10 based on the detection signal of the first axis included in the first detection data SD1 and the detection signal of the first axis included in the second detection data SD2. As in the third embodiment, the operation circuit 30 may perform an operation of calculating a posture and a position of the inertial sensor module 1.

A configuration example of the operation circuit 30 in the fourth embodiment is the same as that in FIG. 2, 7, or 8, and thus illustration and description thereof are omitted.

Figure 10:
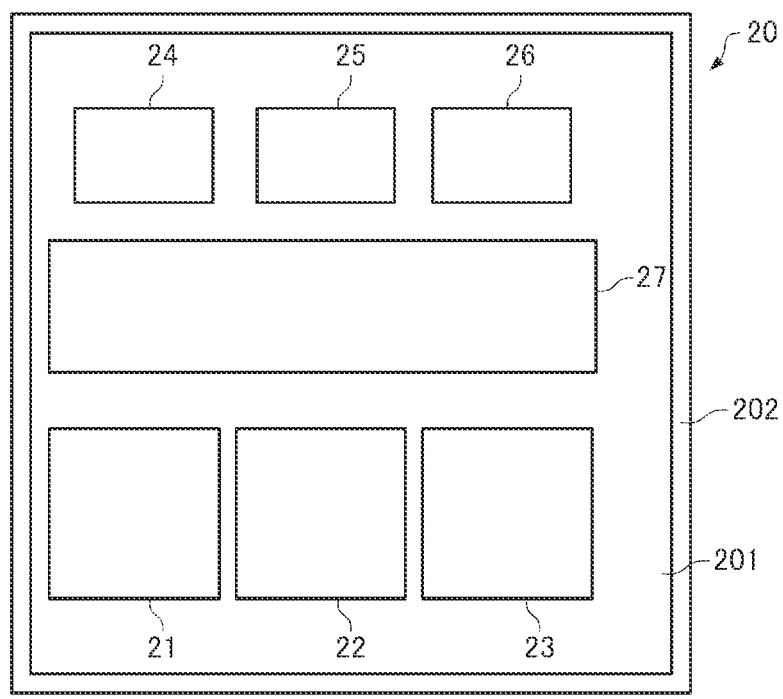
FIG. 10 is a plan view of a second inertial sensor according to the fourth embodiment.

FIG. 10 is a plan view of the second inertial sensor 20 according to the fourth embodiment. In FIG. 10, for convenience of description of the internal configuration of the second inertial sensor 20, components other than the first sensor element 21, the second sensor element 22, the third sensor element 23, the fourth sensor element 24, the fifth sensor element 25, the sixth sensor element 26, and the processing circuit 27 are not shown. A dimensional ratio of each component in FIG. 10 is different from the actual one.

The second inertial sensor 20 is, for example, a six-axis inertial sensor that detects angular velocities with three axes of the X-axis, the Y-axis, and the Z-axis as detection axes, and detects accelerations with three axes of the X-axis, the Y-axis, and the Z-axis as detection axes, respectively. As shown in FIG. 10, the second inertial sensor 20 has a rectangular profile in the plan view from the Z direction. The second inertial sensor 20 includes the silicon substrate 201, the first sensor element 21 formed on the silicon substrate 201 and having the first axis as the detection axis, the second sensor element 22 formed on the silicon substrate 201 and having the second axis as the detection axis, the third sensor element 23 formed on the silicon substrate 201 and having the third axis as the detection axis, the fourth sensor element 24 formed on the silicon substrate 201 and having the fourth axis as the detection axis, the fifth sensor element 25 formed on the silicon substrate 201 and having the fifth axis as the detection axis, the sixth sensor element 26 formed on the silicon substrate 201 and having the sixth axis as the detection axis, the processing circuit 27 which is an integrated circuit and is formed on the silicon substrate 201, and the package 202 accommodating the silicon substrate 201 on which the first sensor element 21, the second sensor element 22, the third sensor element 23, the fourth sensor element 24, the fifth sensor element 25, the sixth sensor element 26, and the processing circuit 27 are formed. The first sensor element 21 detects the angular velocity around the Z-axis, which is the first axis. The second sensor element 22 detects the angular velocity around the X-axis, which is the second axis. The third sensor element 23 detects the angular velocity around the Y-axis, which is the third axis. The fourth sensor element 24 detects the acceleration in the Z-axis direction, which is the fourth axis. The fifth sensor element 25 detects the acceleration in the X-axis direction, which is the fifth axis. The sixth sensor element 26 detects the acceleration in the Y-axis direction, which is the sixth axis. The first sensor element 21, the second sensor element 22, the third sensor element 23, the fourth sensor element 24, the fifth sensor element 25, and the sixth sensor element 26 are electrically coupled to the processing circuit 27. In FIG. 10, a wiring formed on the upper surface of the package 202 and the silicon substrate 201 is not shown.

Also in the fourth embodiment, as in the first embodiment, the second embodiment, or the third embodiment, the detection accuracy of the first inertial sensor 10 is higher than the detection accuracy of the second inertial sensor 20. For example, the sensor element 11 included in the first inertial sensor 10 is an element made of a crystal having a large Q value and excellent temperature characteristics, whereas the first sensor element 21, the second sensor element 22, the third sensor element 23, the fourth sensor element 24, the fifth sensor element 25, and the sixth sensor element 26 included in the second inertial sensor 20 are elements formed of the silicon substrate 201 using a MEMS technique. The first inertial sensor 10 including the sensor element 11 is more expensive but has higher detection accuracy as compared with the second inertial sensor 20 including the first sensor element 21, the second sensor element 22, the third sensor element 23, the fourth sensor element 24, the fifth sensor element 25, and the sixth sensor element 26.

In the present embodiment, a detection signal detected by the first inertial sensor 10 having the detection accuracy higher than that of the second inertial sensor 20 is used for the angular velocity around the Z-axis that requires particularly high detection accuracy, and a detection signal detected by the inexpensive second inertial sensor 20 having the detection accuracy lower than that of the first inertial sensor 10 is used for the angular velocity around the X-axis, the angular velocity around the Y-axis, the acceleration in the X-axis direction, the acceleration in the Y-axis direction, and the acceleration in the Z-axis direction that may require relatively low detection accuracy as compared with the angular velocity around the Z-axis. That is, the operation circuit 30 generates six-axis output data including an output signal of the angular velocity around the Z-axis based on the detection signal of the angular velocity about the Z-axis output from the first inertial sensor 10, an output signal of the angular velocity around the X-axis based on the detection signal of the angular velocity around the X-axis output from the second inertial sensor 20, an output signal of the angular velocity around the Y-axis based on the detection signal of the angular velocity around the Y-axis output from the second inertial sensor 20, an output signal of the acceleration in the Z-axis direction based on the detection signal of the acceleration in the Z-axis direction output from the second inertial sensor 20, an output signal of the acceleration in the X-axis direction based on the detection signal of the acceleration in the X-axis direction output from the second inertial sensor 20, and an output signal of the acceleration in the Y-axis direction based on the detection signal of the acceleration in the Y-axis direction output from the second inertial sensor 20, and outputs the six-axis output data to the host device. Alternatively, the operation circuit 30 generates seven-axis output data including a first output signal of the angular velocity around the Z-axis based on the detection signal of the angular velocity around the Z-axis output from the first inertial sensor 10, a second output signal of the angular velocity around the Z-axis based on the detection signal of the angular velocity around the Z-axis output from the second inertial sensor 20, an output signal of the angular velocity around the X-axis based on the detection signal of the angular velocity around the X-axis output from the second inertial sensor 20, an output signal of the angular velocity around the Y-axis based on the detection signal of the angular velocity around the Y-axis output from the second inertial sensor 20, an output signal of the acceleration in the Z-axis direction based on the detection signal of the acceleration in the Z-axis direction output from the second inertial sensor 20, an output signal of the acceleration in the X-axis direction based on the detection signal of the acceleration in the X-axis direction output from the second inertial sensor 20, and an output signal of the acceleration in the Y-axis direction based on the detection signal of the acceleration in the Y-axis direction output from the second inertial sensor 20, and outputs the seven-axis output data to the host device. The host device performs various operations using the first output signal of the angular velocity around the Z-axis, the output signal of the angular velocity around the X-axis, the output signal of the angular velocity around the Y-axis, the output signal of the acceleration in the Z-axis direction, the output signal of the acceleration in the X-axis direction, and the output signal of the acceleration in the Y-axis direction included in the seven-axis output data.

The first inertial sensor 10 having high detection accuracy may be a quartz crystal sensor that detects an angular velocity around two or more axes, and in the present embodiment, the first inertial sensor 10 only detects an angular velocity around one axis in order to reduce a cost. The second inertial sensor 20 does not necessarily detect an angular velocity around the first axis, and the second inertial sensor 20 detects angular velocities around three axes and accelerations in the three-axis direction in the present embodiment since a silicon MEMS sensor that detects angular velocities around three axes and accelerations in the three-axis direction is in large demand and can be obtained at a low cost.

The inertial sensor module 1 according to the fourth embodiment described above has the same effect as the inertial sensor module 1 according to any one of the first embodiment to the third embodiment.

Further, according to the inertial sensor module 1 in the fourth embodiment, since the first inertial sensor 10 has the first axis as the detection axis, and the second inertial sensor 20 has the first axis, the second axis, the third axis, the fourth axis, the fifth axis, and the sixth axis as the detection axes, output signals of six axes in which the accuracy of the output signal of the first axis is higher than the accuracy of each of the output signals of the second axis, the third axis, the fourth axis, the fifth axis, and the sixth axis is obtained. Therefore, by using the inertial sensor module 1 according to the fourth embodiment, it is possible to implement a system in which higher detection accuracy is required for a specific one axis than the other five axes while preventing unnecessary costs.

5. Modifications

The present disclosure is not limited to the embodiments, and various modifications can be made within the scope of the gist of the present disclosure.

Figure 11:
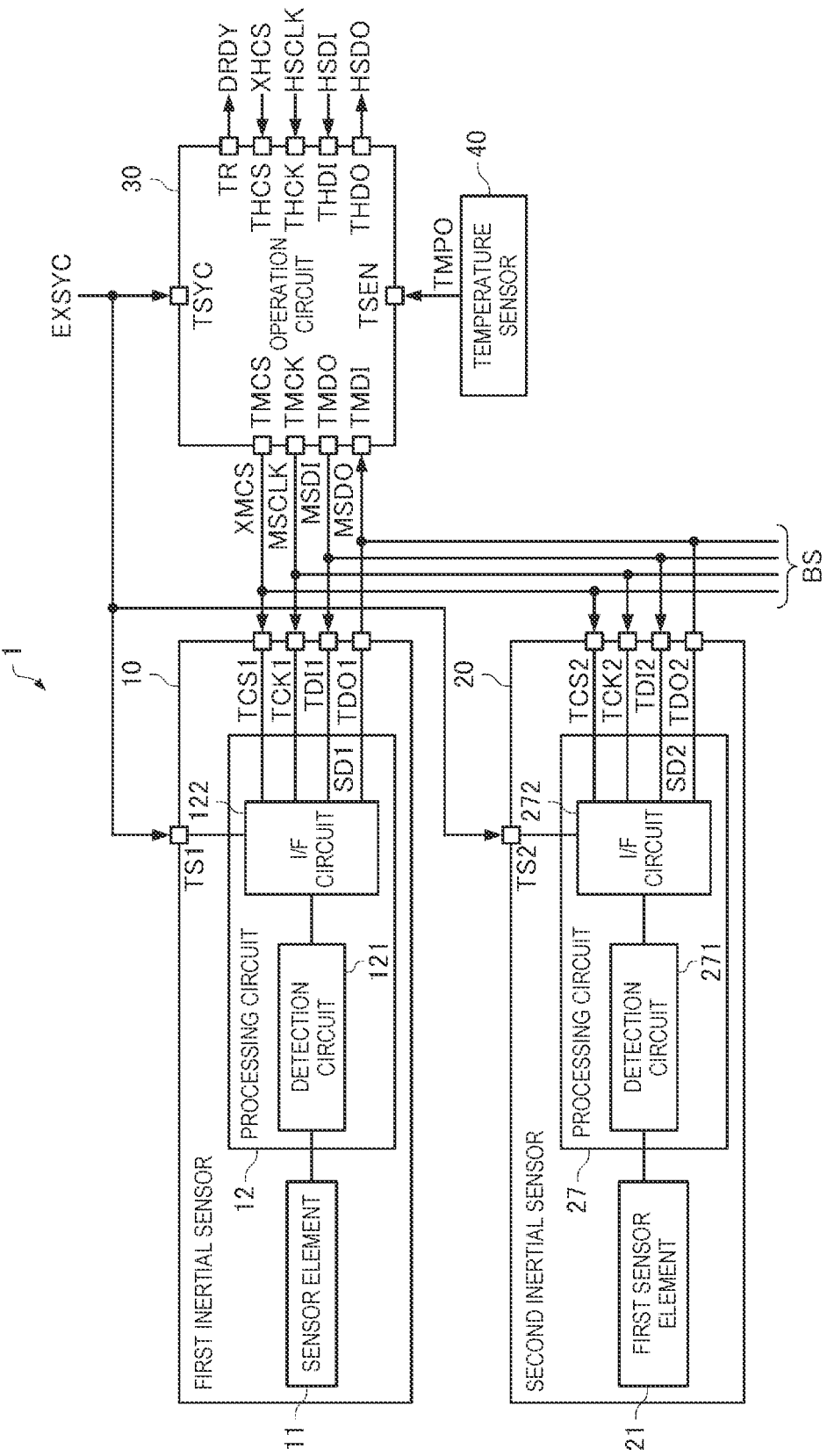
FIG. 11 is a diagram showing an example of a functional configuration of an inertial sensor module according to a modification.

In the above-mentioned embodiments, the second inertial sensor 20 detects physical quantities of three axes or six axes, and the second inertial sensor 20 may detect a physical quantity of one axis, physical quantities of two axes, four axes, five axes, or seven or more axes. As an example, FIG. 11 shows an example of a functional configuration of the inertial sensor module 1 including the second inertial sensor 20 that detects a physical quantity of one axis. In the example of FIG. 11, the sensor element 11 included in the first inertial sensor 10 and the first sensor element 21 included in the second inertial sensor 20 are both sensor elements that detect the same type of physical quantity with the first axis as the detection axis. As in the above-mentioned embodiments, the detection accuracy of the first inertial sensor 10 is higher than the detection accuracy of the second inertial sensor 20. The operation circuit 30 determines whether a failure may have occurred in the first inertial sensor 10 based on the detection signal of the first axis included in the first detection data SD1 output from the first inertial sensor 10 and the detection signal of the first axis included in the second detection data SD2 output from the second inertial sensor 20. In addition, the operation circuit 30 may perform various operations on the first detection data SD1 and the second detection data SD2. Specifically, the operation circuit 30 may perform a filter operation, correction operations such as temperature correction, zero-point correction, sensitivity correction, and nonlinearity correction, a downsampling operation, and the like on the first detection data SD1 and the second detection data SD2. The operation circuit 30 is configured, for example, as shown in FIG. 7. Since the inertial sensor module 1 according to the modification determines whether a failure may have occurred in the first inertial sensor 1, the host device can recognize the reliability of the output signal of the first axis output from the inertial sensor module 1 based on the determination result.

In the above-mentioned second embodiment, even when a failure has occurred in the second inertial sensor 20, the operation circuit 30 determines that a failure may have occurred in the first inertial sensor 10. On the other hand, for example, the inertial sensor module 1 further includes a third inertial sensor that detects a physical quantity of the first axis. The operation circuit 30 may determine whether a failure may have occurred in the first inertial sensor 10 by a majority-voting logic based on the detection signal of the first axis output from the first inertial sensor 10, the detection signal of the first axis output from the second inertial sensor 20, and a detection signal of the first axis output from the third inertial sensor. For example, when a difference between the detection signal of the first axis output from the second inertial sensor 20 and the detection signal of the first axis output from the third inertial sensor is within a predetermined range, and the difference between the detection signal of the first axis output from the first inertial sensor 10 and the detection signal of the first axis output from the second inertial sensor 20 or the difference between the detection signal of the first axis output from the first inertial sensor 10 and the detection signal of the first axis output from the third inertial sensor exceeds a predetermined range, the operation circuit 30 may determine that a failure may have occurred in the first inertial sensor 10.

In the above-mentioned embodiments, the inertial sensor module 1 includes the first inertial sensor 10 having relatively high detection accuracy and the second inertial sensor 20 having relatively low detection accuracy. On the other hand, the inertial sensor module 1 may further include a third inertial sensor having the same detection accuracy as the first inertial sensor 10, in addition to the first inertial sensor 10 and the second inertial sensor 20. The third inertial sensor may be, for example, an inertial sensor having the same structure as the first inertial sensor 10. The operation circuit 30 may generate an output signal of the first axis by averaging the detection signal of the first axis output from the first inertial sensor 10 and the detection signal of the first axis output from the third inertial sensor. By this averaging, the output signal of the first axis with reduced noise is obtained. The operation circuit 30 may determine whether a failure may have occurred in each of the first inertial sensor 10, the second inertial sensor 20, and the third inertial sensor by, for example, the majority-voting logic based on the detection signal of the first axis output from the first inertial sensor 10, the detection signal of the first axis output from the second inertial sensor 20, and the detection signal of the first axis output from the third inertial sensor.

Alternatively, the inertial sensor module 1 may further include a third inertial sensor having the same detection accuracy as the second inertial sensor 20, in addition to the first inertial sensor 10 and the second inertial sensor 20. The third inertial sensor may be, for example, an inertial sensor having the same structure as the second inertial sensor 20. The operation circuit 30 may generate an output signal of each axis other than the first axis by averaging a detection signal of each axis other than the first axis output from the second inertial sensor 20 and a detection signal of each axis other than the first axis output from the third inertial sensor. By this averaging, the output signal of each axis other than the first axis with reduced noise is obtained. The operation circuit 30 may determine whether a failure may have occurred in each of the first inertial sensor 10, the second inertial sensor 20, and the third inertial sensor by, for example, the majority-voting logic based on the detection signal of the first axis output from the first inertial sensor 10, the detection signal of the first axis output from the second inertial sensor 20, and the detection signal of the first axis output from the third inertial sensor. The operation circuit 30 may determine whether a failure may have occurred in the second inertial sensor 20 or the third inertial sensor by, for example, the majority-voting logic based on the detection signal of each axis other than the first axis output from the second inertial sensor 20 and the detection signal of each axis other than the first axis output from the third inertial sensor.

Alternatively, the inertial sensor module 1 may further include a third inertial sensor having the same detection accuracy as the first inertial sensor 10 and a fourth inertial sensor having the same detection accuracy as the second inertial sensor 20. The third inertial sensor may be, for example, an inertial sensor having the same structure as the first inertial sensor 10, and the fourth inertial sensor may be, for example, an inertial sensor having the same structure as the second inertial sensor 20. The operation circuit 30 may generate an output signal of the first axis by averaging the detection signal of the first axis output from the first inertial sensor 10 and the detection signal of the first axis output from the third inertial sensor, and generate an output signal of each axis other than the first axis by averaging the detection signal of each axis other than the first axis output from the second inertial sensor 20 and a detection signal of each axis other than the first axis output from the fourth inertial sensor. By this averaging, the output signal of each axis with reduced noise is obtained. The operation circuit 30 may determine whether a failure may have occurred in each of the first inertial sensor 10, the second inertial sensor 20, the third inertial sensor, and the fourth inertial sensor by, for example, the majority-voting logic based on the detection signal of the first axis output from the first inertial sensor 10, the detection signal of the first axis output from the second inertial sensor 20, the detection signal of the first axis output from the third inertial sensor, and a detection signal of the first axis output from the fourth inertial sensor. The operation circuit 30 may determine whether a failure may have occurred in the second inertial sensor 20 or the fourth inertial sensor by, for example, the majority-voting logic based on the detection signal of each axis other than the first axis output from the second inertial sensor 20 and the detection signal of each axis other than the first axis output from the fourth inertial sensor.

In the above-mentioned embodiments, an example is given in which the first inertial sensor 10 having relatively high accuracy is a crystal sensor and the second inertial sensor 20 having relatively low accuracy is a silicon MEMS sensor, and the present disclosure is not limited thereto. For example, the first inertial sensor 10 having relatively high accuracy may be a FOG sensor, and the second inertial sensor 20 having relatively low accuracy may be a silicon MEMS sensor. The FOG is an abbreviation for fiber optic gyroscope.

The embodiments and the modifications described above are merely examples, and the present disclosure is not limited thereto. For example, the embodiments and modifications can be appropriately combined.

The present disclosure includes a configuration substantially the same as the configurations described in the embodiments (for example, a configuration having the same functions, methods, and results, or a configuration having the same objects and effects). In addition, the present disclosure includes a configuration in which an unnecessary portion of the configurations described in the embodiments is replaced. The present disclosure includes a configuration having the same functions and effects as the configurations described in the embodiments, or a configuration capable of achieving the same objects. The present disclosure includes a configuration in which a known technique is added to the configurations described in the embodiments.

The following contents are derived from the above-mentioned embodiments and modifications.

One aspect of an inertial sensor module includes: a first inertial sensor having a first axis as a detection axis; and a second inertial sensor having the first axis, a second axis, and a third axis as detection axes, in which the first inertial sensor and the second inertial sensor are separated from each other, and detection accuracy of the first inertial sensor is higher than detection accuracy of the second inertial sensor.

According to the inertial sensor module, since the detection accuracy of the first inertial sensor having the first axis as the detection axis is higher than the detection accuracy of the second inertial sensor having the first axis, the second axis, and the third axis as the detection axes, high detection accuracy for the first axis can be achieved by the first inertial sensor.

In one aspect of the inertial sensor module, an output signal of the first axis based on a detection signal of the first axis output from the first inertial sensor, an output signal of the second axis based on a detection signal of the second axis output from the second inertial sensor, and an output signal of the third axis based on a detection signal of the third axis output from the second inertial sensor may be output to outside in synchronization with one another.

According to the inertial sensor module, output signals of three axes in which the accuracy of the output signal of the first axis is higher than the accuracy of each of the output signals of the second axis and the third axis is obtained. Therefore, by using the inertial sensor module, it is possible to implement a system in which higher detection accuracy is required for a specific one axis than the other two axes while preventing unnecessary costs.

In one aspect of the inertial sensor module, the second inertial sensor may include a first sensor element formed at a silicon substrate and having the first axis as a detection axis, a second sensor element formed at the silicon substrate and having the second axis as a detection axis, and a third sensor element formed at the silicon substrate and having the third axis as a detection axis.

According to the inertial sensor module, a manufacturing cost of the second inertial sensor is reduced, and thus cost reduction is achieved.

One aspect of the inertial sensor module may further include an operation circuit. The operation circuit may determine whether a failure may have occurred in the first inertial sensor based on a detection signal of the first axis output from the first inertial sensor and a detection signal of the first axis output from the second inertial sensor.

Since the inertial sensor module determines whether a failure may have occurred in the first inertial sensor, an external device can recognize the reliability of the detection signal of the first axis output from the first inertial sensor.

In one aspect of the inertial sensor module, the operation circuit may compare the detection signal of the first axis output from the first inertial sensor with the detection signal of the first axis output from the second inertial sensor, and may determine whether a failure may have occurred in the first inertial sensor based on a comparison result.

In the inertial sensor module, since the first inertial sensor and the second inertial sensor have different structures, the probability of failure at the same time is fairly low. Therefore, according to the inertial sensor module, it is possible to determine whether a failure may have occurred in the first inertial sensor by comparing the detection signal of the first axis output from the first inertial sensor with the detection signal of the first axis output from the second inertial sensor.

One aspect of the inertial sensor module may further include an operation circuit. The operation circuit may perform an operation based on a detection signal of the first axis output from the first inertial sensor, a detection signal of the second axis output from the second inertial sensor, and a detection signal of the third axis output from the second inertial sensor.

According to the inertial sensor module, since the accuracy of the detection signal of the first axis used for the operation is higher than the accuracy of the detection signal of the second axis and the accuracy of the detection signal of the third axis, the operation related to the three axes can be performed with high accuracy in particular when the inertial sensor module is used in a system in which the detection accuracy of the first axis is important.

In one aspect of the inertial sensor module, the second inertial sensor may further have a fourth axis, a fifth axis, and a sixth axis as detection axes.

According to the inertial sensor module, output signals of six axes in which the accuracy of the output signal of the first axis is higher than the accuracy of each of the output signals of the second axis, the third axis, the fourth axis, the fifth axis, and the sixth axis is obtained. Therefore, by using the inertial sensor module, it is possible to implement a system in which higher detection accuracy is required for a specific one axis than the other five axes while preventing unnecessary costs.

Another aspect of an inertial sensor module includes: a first inertial sensor having a first axis as a detection axis; a second inertial sensor having the first axis as a detection axis; and an operation circuit, in which detection accuracy of the first inertial sensor is higher than detection accuracy of the second inertial sensor, and the operation circuit determines whether a failure may have occurred in the first inertial sensor based on a detection signal of the first axis output from the first inertial sensor and a detection signal of the first axis output from the second inertial sensor.

Since the inertial sensor module determines whether a failure may have occurred in the first inertial sensor, the external device can recognize the reliability of the detection signal of the first axis output from the first inertial sensor.

What is claimed is:

1. An inertial sensor module comprising:
    a first inertial sensor accommodated within a single package and only having a first axis as a detection axis;
    a second inertial sensor having the first axis, a second axis, and a third axis as detection axes;
    a printed circuit board having a planar main surface, which is an upper surface of the printed circuit board, on which the first inertial sensor and the second inertial sensor are provided;
    a metal cap bonded to the main surface of the printed circuit board such that the first inertial sensor and the second inertial sensor are accommodated between the main surface and the metal cap; and
    an operation circuit, which is an integrated circuit device, provided on a lower surface of the printed circuit board, the lower surface of the printed circuit board being opposite to the upper surface, wherein
    the first inertial sensor and the second inertial sensor are separated from each other,
    detection accuracy of the first inertial sensor is higher than detection accuracy of the second inertial sensor,
    the first inertial sensor and the second inertial sensor detect a same physical quantity, and
    the first inertial sensor is a quartz crystal sensor and the second inertial sensor includes sensor elements formed of a silicon substrate.

2. The inertial sensor module according to claim 1, wherein
    an output signal of the first axis based on a detection signal of the first axis output from the first inertial sensor, an output signal of the second axis based on a detection signal of the second axis output from the second inertial sensor, and an output signal of the third axis based on a detection signal of the third axis output from the second inertial sensor are output to outside the inertial sensor module in synchronization with one another.

3. The inertial sensor module according to claim 1, wherein
    the second inertial sensor includes
    a first sensor element formed at a silicon substrate and having the first axis as a detection axis,
    a second sensor element formed at the silicon substrate and having the second axis as a detection axis, and
    a third sensor element formed at the silicon substrate and having the third axis as a detection axis.

4. The inertial sensor module according to claim 1, wherein
    the operation circuit determines whether a failure has occurred in the first inertial sensor based on a first detection signal of the first axis output from the first inertial sensor and a second detection signal of the first axis output from the second inertial sensor.

5. The inertial sensor module according to claim 4, wherein
    the operation circuit compares the first detection signal of the first axis output from the first inertial sensor with the second detection signal of the first axis output from the second inertial sensor, and determines whether the failure has occurred in the first inertial sensor based on a result of comparing the first detection signal with the second detection signal.

6. The inertial sensor module according to claim 1, wherein the operation circuit performs an operation based on a detection signal of the first axis output from the first inertial sensor, a detection signal of the second axis output from the second inertial sensor, and a detection signal of the third axis output from the second inertial sensor.

7. The inertial sensor module according to claim 1, wherein
the second inertial sensor further includes a fourth axis, a fifth axis, and a sixth axis as detection axes.

8. An inertial sensor module comprising:
a first inertial sensor, which is a quartz crystal sensor, only having a first axis as a detection axis;
a second inertial sensor, having sensor elements formed of a silicon substrate, having the first axis as a detection axis;
a printed circuit board having a planar main surface, which is an upper surface of the printed circuit board, on which the first inertial sensor and the second inertial sensor are provided;
a metal cap bonded to the main surface of the printed circuit board such that the first inertial sensor and the second inertial sensor are accommodated between the main surface and the metal cap; and
an operation circuit, which is an integrated circuit device, provided on a lower surface of the printed circuit board, the lower surface of the printed circuit board being opposite to the upper surface, wherein
detection accuracy of the first inertial sensor is higher than detection accuracy of the second inertial sensor,
the operation circuit determines whether a failure has occurred in the first inertial sensor based on a detection signal of the first axis output from the first inertial sensor and a detection signal of the first axis output from the second inertial sensor, and
the operation circuit compares the first detection signal of the first axis output from the first inertial sensor with the second detection signal of the first axis output from the second inertial sensor, and determines whether the failure has occurred in the first inertial sensor based on a result of comparing the first detection signal with the second detection signal.

9. The inertial sensor module according to claim 5, wherein
the operation circuit compares the first detection signal of the first axis output from the first inertial sensor with the second detection signal of the first axis output from the second inertial sensor by determining a difference between the first detection signal of the first axis output from the first inertial sensor with the second detection signal of the first axis output from the second inertial sensor, and determines that the failure has occurred in the first inertial sensor when the difference is greater than a predetermined value.

10. The inertial sensor module according to claim 8, wherein
the operation circuit compares the first detection signal of the first axis output from the first inertial sensor with the second detection signal of the first axis output from the second inertial sensor by determining a difference between the first detection signal of the first axis output from the first inertial sensor with the second detection signal of the first axis output from the second inertial sensor, and determines that the failure has occurred in the first inertial sensor when the difference is greater than a predetermined value.

11. The inertial sensor module according to claim 1, wherein
the printed circuit board has a rectangular plate shape so that the planar main surface has a rectangular shape.

12. The inertial sensor module according to claim 8, wherein
the printed circuit board has a rectangular plate shape so that the planar main surface has a rectangular shape.

13. The inertial sensor module according to claim 1, further comprising:
a third inertial sensor accommodated within the single package and only having the first axis as a detection axis, wherein
the third inertial sensor is a quartz crystal sensor having a same detection accuracy as the first inertial sensor;
the operation circuit determines whether a failure has occurred in the first inertial sensor based on a first detection signal of the first axis output from the first inertial sensor, a second detection signal of the first axis output from the second inertial sensor, and a third detection signal of the first axis output from the third inertial sensor; and
the operation circuit determines whether the failure has occurred by a majority voting logic based on the first detection signal, the second detection signal, and the third detection signal.

* * * * *